United States Patent
Kim et al.

(10) Patent No.: US 8,971,918 B2
(45) Date of Patent: Mar. 3, 2015

(54) METHOD FOR POSITIONING TARGET TERMINAL WHILE PROTECTING PRIVACY OF USER THEREOF

(71) Applicant: Samsung Electronics Co. Ltd., Suwon-si, Gyeonggi-do (KR)

(72) Inventors: Joo-Young Kim, Suwon-si (KR); Wuk Kim, Gwacheon-si (KR); Hae-Young Jun, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 13/689,038

(22) Filed: Nov. 29, 2012

(65) Prior Publication Data
US 2014/0141797 A1    May 22, 2014

Related U.S. Application Data

(63) Continuation of application No. 11/758,164, filed on Jun. 5, 2007, now Pat. No. 8,478,287.

(30) Foreign Application Priority Data

Jun. 7, 2006 (KR) .......... 10-2006-0051073
Oct. 2, 2006 (KR) .......... 10-2006-0097349

(51) Int. Cl.
*H04W 24/00* (2009.01)
*H04W 12/02* (2009.01)
*H04L 29/06* (2006.01)
*H04W 8/26* (2009.01)
*H04W 64/00* (2009.01)

(52) U.S. Cl.
CPC ........ *H04W 24/00* (2013.01); *H04W 8/26* (2013.01); *H04W 64/00* (2013.01); *H04W 12/02* (2013.01); *H04L 63/0414* (2013.01)
USPC ............. 455/456.1; 455/414.1; 455/456.2

(58) Field of Classification Search
USPC ............... 455/456.1–456.6, 440; 370/398
See application file for complete search history.

(56) References Cited

U.S. PATENT DOCUMENTS

| 7,869,815 | B2 | 1/2011 | Ishii |
| 2005/0118999 | A1 | 6/2005 | Zhu |
| 2005/0153687 | A1 | 7/2005 | Niemenmaa et al. |
| 2005/0239480 | A1 | 10/2005 | Kim et al. |
| 2005/0250516 | A1 | 11/2005 | Shim |
| 2006/0246920 | A1 | 11/2006 | Shim |

FOREIGN PATENT DOCUMENTS

| CN | 1794874 A | 6/2006 |
| CN | 101072430 A | 11/2007 |
| KR | 10-2003-0052841 A | 6/2003 |
| KR | 10-2003-0068474 A | 8/2003 |
| KR | 10-2006-0013323 A | 2/2006 |

OTHER PUBLICATIONS

Privacy Checking Protocol Draft Version 1.0-May 16, 2006. Open Mobile Alliance. OMA-TS-PCP-V1 0-20060516-D.

*Primary Examiner* — Kashif Siddiqui
(74) *Attorney, Agent, or Firm* — Jefferson IP Law, LLP

(57) ABSTRACT

A method of providing location information of a target Secure User Plane Location (SUPL) Enabled Terminal (target SET) while protecting privacy of a user of the target SET in a Home-SUPL Location Center (H-SLC) providing the location information of the target SET, and the H-SLC, are provided. The method includes receiving a location request message from a requester, transmitting an SUPL INITiation (SUPL INIT) message by using a first session IDentifier (ID) to the target SET, the first session ID including a real ID of the target SET, transmitting a Positioning DATA (PDATA) message by using a second session ID to the Home-SUPL Positioning Center (H-SPC), the second session ID including a pseudo-ID for secure connection between the H-SLC and the H-SPC, receiving a positioning result of the target SET from the H-SPC, and transmitting the positioning result to the requester.

18 Claims, 11 Drawing Sheets

| SET Session ID | M | Part of Session ID pertaining to the SET |
|---|---|---|
| SLP Session ID | M | Part of Session ID pertaining to the SLP |

FIG.5A

| Parameter | Presence | Values/description |
|---|---|---|
| Session ID | ESSENTIAL | UNIQUE ID USED ON SET SIDE. POSITIONING MESSAGE IN PROGRESS IS IDENTIFIED WITH THIS ID |
| SET ID | ESSENTIAL | TYPE THAT CAN BE USED AS SET ID<br><br>• MSISDN<br>• MDN<br>• MIN<br>• IMSI<br>• NAI<br>• Pseudonym ID<br>• Pseudo ID<br>• IP Addres<br>   ◦ IPv4<br>   ◦ IPv6 |

FIG.5B

| Parameter | Presence | Values/description |
|---|---|---|
| Session ID | ESSENTIAL | ID USED FOR EXCHANGING POSITIONING MESSAGE IN PROGRESS BY SLC. SLC, AS SERVER, PROCESSES POSITIONING REQUESTS THAT ARE IN SESSION WITH MULTIPLE TERMINALS. WITH REGARD TO THIS, POSITIONING REQUEST IN SESSION WITH ONE TERMINAL IS IDENTIFIED BY THIS PARAMETER. SLC CREATES UNIQUE NUMBER AND PUTS VALUE THEREOF INTO THIS PARAMETER. |
| SLC ID | ESSENTIAL | ID OF SLC TYPE THAT CAN BE USED AS SLC ID<br><br>• IP Address<br>   ◦ IPv4<br>   ◦ IPv6<br>• FQDN |

FIG.5C

| Parameter | Presence | Values/description |
|---|---|---|
| ID Mode | OPTIONAL | LOCATION SERVER (OR SLC) DETERMINES WHETHER REAL ID OR PSEUDO-ID IS USED AS SET ID, AND INDICATES RESULT THEREOF IN ID MODE. |

FIG.5D

METHOD FOR POSITIONING TARGET TERMINAL WHILE PROTECTING PRIVACY OF USER THEREOF

PRIORITY

This application is a continuation of prior application Ser. No. 11/758,164, filed on Jun. 5, 2007, which claimed the benefit under 35 U.S.C. §119(a) of a Korean patent application filed on Jun. 7, 2006 in the Korean Intellectual Property Office and assigned Ser. No. 10-2006-0051073, and a Korean patent application filed on Oct. 2, 2006 in the Korean Intellectual Property Office and assigned Ser. No. 10-2006-0097349, the entire disclosure of each of which is hereby incorporated by reference.

BACKGROUND OF THE INVENTION

1. Field of the Invention

The present invention relates to a method for protecting a user of a target terminal from privacy violation during message exchange between a Secure User Plane Location (SUPL) Location Center (SLC) and an SUPL Positioning Center (SPC).

2. Description of the Related Art

Nowadays, a service using location information of a mobile terminal is increasingly being utilized in a wide range of applications. Meanwhile, various methods for positioning a mobile terminal have been developed. One of these methods is an Internet Protocol (IP) network-based positioning method. In such a positioning method, a mobile terminal may receive information on a Global Positioning System (GPS) satellite from a location server so that it can use an Assisted-Global Positioning System (A-GPS). To this end, the location server carries positioning assistance data of the GPS satellite to the mobile terminal through a data packet of an IP network. Further, the mobile terminal measures location measurement data by using the corresponding positioning assistance data, and carries the location measurement data to the location server through a data packet of the IP network. This method corresponds to a location service using a Secure User Plane Location (SUPL) that is handled by an Open Mobile Alliance Location Working Group (OMA LOC WG).

A location server used in SUPL is called a Secure Location Platform (SLP), and the SLP includes two functional entities, that is, an SUPL Location Center (SLC) and an SUPL Positioning Center (SPC). The SLC receives a request for a location service targeted to a specific mobile terminal (target SUPL Enabled Terminal, hereinafter referred to as "target SET") from a client, that is, an SUPL Agent, performs authentication and authorization procedures for the client (i.e., SUPL Agent) before positioning the target SET at the request of the client, and checks privacy set in advance by the target SET. Further, the SLP processes charging for the location service and a roaming case of the target SET.

The SPC creates location assistance data to be sent to a target SET, and performs positioning of the target SET by using location measurement data transferred from the target SET. Further, the SPC determines a positioning method (posmethod), which is to be used in the positioning process, with the target SET.

In such a situation where an SLP includes an SLC for managing requests/responses and an SPC for positioning a target SET, an interface for exchanging data exists between the SLC and the SPC. This interface enables a plurality of SLCs to share and use an SPC, and vice versa.

FIG. 1 illustrates a conventional procedure of delivering the real IDentifier (ID) of a target SET to an SPC when an SLP is divided into an SLC and the SPC.

A. An SUPL Agent transmits a Mobile Location Protocol Start Location Immediate Request (MLP SLIR) message, that is, a location service request message, to a Home-SLC (H-SLC, i.e., an SLC included in a Home SLP). The MLP SLIR message includes a mobile station ID (ms-ID, i.e., ID of a target SET), a client-ID (i.e., ID of the SUPL Agent), and Quality of Position (QoP) of the requested location service.

B. The H-SLC determines if the target SET is roaming.

C. The H-SLC transmits a Positioning Request (PREQ) message to a Home-SPC (H-SPC, i.e., an SPC included in a Home SLP). The PREQ message includes a session-ID and a posmethod. The session-ID includes of an SLC session-ID and an SET session-ID. The H-SLC creates the SLC session-ID by using its own ID and a unique number for identifying a session in progress by the SLC. The H-SLC completes the session-ID while leaving the SET session-ID empty. The H-SLC transmits posmethod, which is information on a positioning method to be used this time, to the H-SPC. The posmethod represents a protocol to be used for positioning and a positioning type. Details of the posmethod are the same as those of a posmethod specified in the OMA TS ULP V2_0 standard, which is hereby incorporated by reference.

D. The H-SPC acquires the session-ID and the posmethod from the H-SLC as in step C. Further, the H-SPC transmits a Positioning Response (PRES) message accepting the positioning request to the H-SLC.

E. The H-SLC informs the target SET of the positioning request by transmitting an SUPL Initiation (SUPL INIT) message thereto. The SUPL INIT message includes the session-ID created in step D, the posmethod, and an SLP mode, which is specified in the OMA TS ULP V2_0 standard, representing whether a positioning process follows a proxy mode or a non-proxy mode. The proxy mode refers to a mode used when an H-SLC and H-SPC are integrated into an H-SLP, and the non-proxy mode refers to a mode used when an H-SLP is divided into an H-SLC and an H-SPC.

F. The target SET attempts to connect data communication.

G. The target SET transmits an SUPL Positioning Initiation (SUPL POS INIT) message to the H-SLP. The SUPL POS INIT message includes SET capability including information on positioning methods supportable by itself, and a Location ID (LID, e.g., cell ID) representing currently existing network information. Just at this moment, the target SET fills the SET session-ID included in the session-ID with its own real ID. Here, the real ID is unique information for recognizing a target SET on a network or identifying a target SET from other SETs. For example, the real ID may be an International Mobile Subscriber Identity (IMSI) value or a Mobile Station International Integrated Services Digital Network (MSISDN) value. Further, the real ID may be a unique IP address assigned to a target SET.

H. The H-SLC transmits the SUPL POS INIT message created in step G to the H-SPC through Positioning Data (PDATA). In this way, the H-SPC receives the real ID of the target SET.

I. (optional step) If the H-SPC cannot create a coarse position by using the LID of the SUPL POS INIT message included in the PDATA, it transmits a request for the coarse position to the H-SLC by returning the LID through a Positioning LID Request (PLREQ) message. Here, the coarse position refers to information about an actual geographic region corresponding to network information, such as an LID (e.g., place-name information for a current location, such as Seoul, Incheon, etc. or Gangnam-gu, Gangbuk-gu, etc.).

J. (optional step) Upon receiving the PLREQ message as in step I, the H-SLC creates a coarse position based on the returned LID, and then transmits the created coarse position to the H-SPC.

K. The target SET performs a positioning process with the H-SPC and the H-SLC. Details of the positioning process are the same as those of an SUPL POS (SUPL Positioning) specified in the OMA LOC AD SUPL V2_0 standard.

L. Upon completing positioning of the target SET, the H-SPC transmits PDATA, including an SUPL END message to be sent to the target SET, to the H-SLC.

M. The H-SLC transmits the SUPL END message to the target SET.

N. The H-SPC transmits a positioning result (posresult) to the H-SLC.

O. The H-SLC transmits the posresult to the SUPL Agent.

The fact that an SLC and an SPC are separated means that the SLC and the SPC may be managed by different network operators (e.g., mobile communication providers). For example, a network operator manages only an SLC, and an SPC may exist on an external network. In such a case, if the SLC transfers the real ID (e.g., MSISDN, IMSI, IP ADDRESS) of a target SET to the SPC, there is a risk that the current location of the target SET is exposed. That is, if the location information and real ID of a target SET are simultaneously exchanged between the SLC and the SPC, there is a problem in that the privacy of the target SET is violated.

In general, a user of a target SET does not make a contract with an SPC of an SLP, but makes a contract with an SLC for location service rights. Also, since the real ID of the user of a target SET is connected directly with his/her own privacy, he/she does not want his/her real ID to be transmitted to entities other than an SLC. Moreover, an SPC does not necessarily require the real ID of a target SET. This is because an SPC has only to identify a plurality of positioning requests input therein and appropriately respond to a corresponding request.

SUMMARY OF THE INVENTION

Accordingly, the present invention has been made to solve at least the above-mentioned problems and/or disadvantages and to provide at least the advantages described below. Accordingly, an aspect of the present invention is to provide a method for positioning a target terminal while protecting the privacy of a user of the target terminal.

In accordance with an aspect of the present invention, a method of providing location information of a target Secure User Plane Location (SUPL) Enabled Terminal (target SET) while protecting privacy of a user of the target SET in a Home-SUPL Location Center (H-SLC) providing the location information of the target SET is provided. The method includes receiving a location request message from a requester, transmitting an SUPL INITiation (SUPL INIT) message by using a first session IDentifier (ID) to the target SET, the first session ID including a real ID of the target SET, transmitting a Positioning DATA (PDATA) message by using a second session ID to the Home-SUPL Positioning Center (H-SPC), the second session ID including a pseudo-ID for secure connection between the H-SLC and the H-SPC, receiving a positioning result of the target SET from the H-SPC, and transmitting the positioning result to the requester.

In accordance with another aspect of the present invention, an H-SLC for providing location information of a target SET while protecting privacy of a user of the target SET is provided. The H-SLC includes a processing module configured to receive a location request message from a requester, transmit an SUPL INIT message by using a first session ID to the target SET, transmit a PDATA message by using a second session ID to the H-SPC, receive a positioning result of the target SET from the H-SPC and transmit the positioning result to the requester, and a session ID initiator to initiate the first session ID including a real ID of the target SET and the second session ID including a pseudo-ID for secure connection between the H-SLC and the H-SPC.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 5A to 5D are illustrative views of the concrete configuration of a session-Identifier (ID) created by an H-SLC in accordance with an exemplary embodiment of the present invention;

Throughout the drawings, like reference numerals will be understood to refer to like parts, components and structures.

DETAILED DESCRIPTION OF EXEMPLARY EMBODIMENTS

Hereinafter, the following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, in the following description, a detailed description of known functions and configurations incorporated herein will be omitted for clarity and conciseness.

Figure 1:
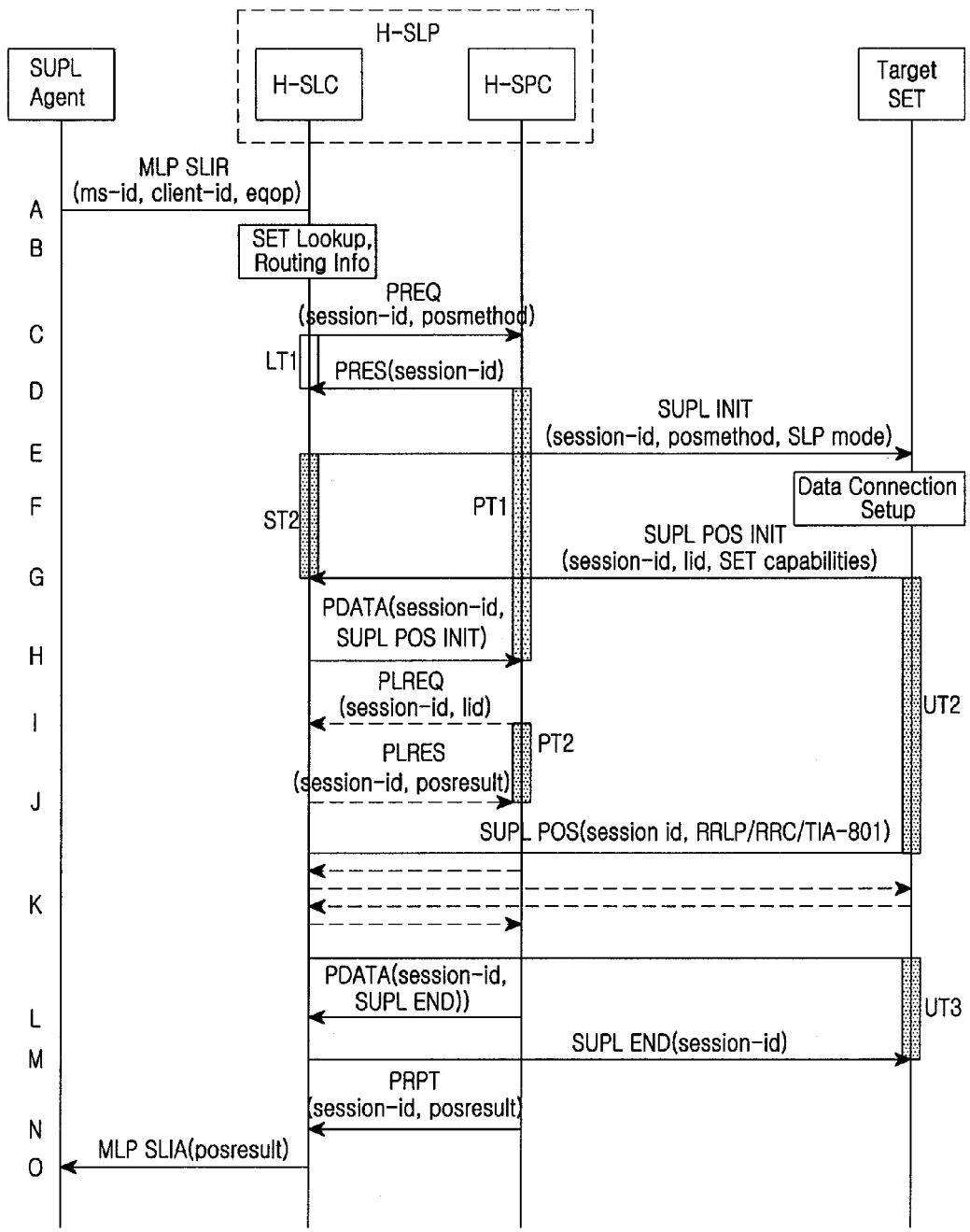
FIG. 1 is a flowchart illustrating a conventional procedure of positioning a target SET.
Figure 2:
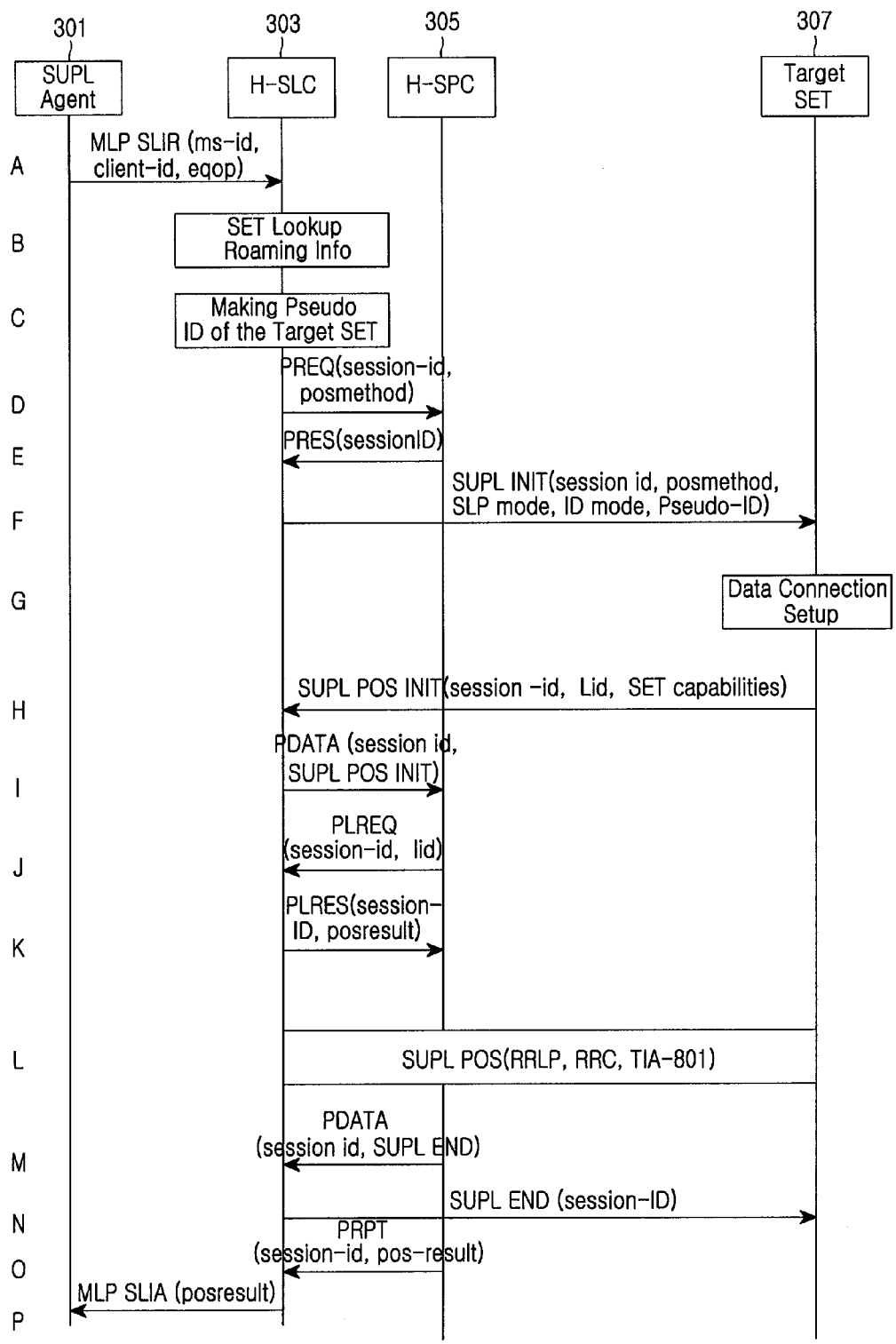
FIG. 2 is a flowchart illustrating a procedure of positioning a target SET in accordance with an exemplary embodiment of the present invention.

FIG. 2 is a flowchart illustrating a procedure of positioning a target SET according to an exemplary embodiment of the present invention. In FIG. 2, it is also assumed that an H-SLC and an H-SPC are constituent elements of an H-SLP.

Reference will now be made to a procedure of positioning a target SET according to an exemplary embodiment of the present invention, with reference to FIG. 2.

A. An SUPL Agent 301 transmits a Mobile Location Protocol Start Location Immediate Request (MLP SLIR) message, that is, a location service request message, to an H-SLC 303. The MLP SLIR message includes an ms-Identifier (ID) (i.e., ID of a target SET 307), a client-ID (i.e., ID of the SUPL Agent), and QoP of the requested location service.

B. The H-SLC 303 determines if the target SET 307 is roaming.

C. The H-SLC 303 creates a pseudo-ID of the target SET 307. The pseudo-ID is used for identifying the corresponding target SET 307 when an H-SPC 305 performs positioning of the target SET 307. The reason why the pseudo-ID is used is that, if the real ID and location information of the target SET 307 are transmitted together in the course of positioning the target SET 307 and transmitting its location information, the location information of the target SET 307 is very likely to be hacked and thus the privacy of a user of the target SET 307 is violated. Thus, in consideration of this, the pseudo-ID is used so as to prevent the real ID from being transferred to the H-SPC 305 performing positioning of the target SET 307. The H-SLC 303 may create the pseudo-ID by any unique number.

Alternatively, the H-SLC 303 may use a pseudonym-ID by sending the real-ID (it is assumed herein that the real ID is an ms-ID, and the real ID is used pursuant to specifications of an SET session-ID defined in the OMA TS ULP V2.0 standard) to a Privacy Control Entity (PCE) and receiving a prearranged pseudonym-ID corresponding to the real ID from the PCE. The pseudonym-ID is used pursuant to specifications disclosed in the OMA PCP V1.0 standard, which is hereby incorporated by reference. That is, the H-SLC 303 may create a pseudo-ID to be used when positioning of the target SET 307 is in progress, or may use the same pseudonym-ID as that specified in OMA PCP V1.0 standard.

D. The H-SLC 303 transmits a PREQ message to the H-SPC 305. With regard to this, the H-SLC 303 adds the pseudo-ID created in step C or the pseudonym-ID to an SET session ID of a session-ID included in the PREQ message, and then transmits the PREQ message. The session-ID includes an SLC session-ID and the SET session-ID. The H-SLC 303 creates the SLC session-ID by using its own ID and a unique number for identifying a session in progress by the H-SLC 303. Further, the H-SLC 303 transmits the PREQ message to the H-SPC 305 while filling the SET session-ID with the pseudo-ID or pseudonym-ID created in step C. The H-SLC 303 transmits posmethod, which is information on a positioning method to be used this time, to the H-SPC 305. The posmethod represents a protocol to be used for positioning and a positioning type. Details of the posmethod are the same as those of a posmethod specified in the OMA TS ULP V2_0 standard.

E. The H-SPC 305 acquires the pseudo-ID or pseudonym-ID of the target SET 307 by looking into the session-ID received from the H-SLC 303 in step D. The H-SPC 305 also acquires the posmethod transmitted by the H-SLC 303. Further, the H-SPC 305 transmits a PRES message accepting the PREQ to the H-SLC 303.

F. The H-SLC 303 informs the target SET 307 of the PREQ by transmitting an SUPL INIT message thereto. The SUPL INIT message includes the session-ID created in step D, the posmethod, and an SLP mode (an SLP mode specified in the OMA TS ULP V2_0 standard is used in its entirety) representing whether a positioning process follows a proxy mode or a non-proxy mode. In an exemplary embodiment of the present invention, the SUPL INIT message further includes an ID mode representing whether the real ID of the target SET 307 is used, or the pseudo-ID or pseudonym-ID transmitted by the H-SLC 303 is used when the target SET 307 uses the SET session-ID. Further, the H-SLC 303 carries the pseudo-ID or pseudonym-ID created in step C to the target SET 307 through the SUPL INIT message.

G. The target SET 307 attempts to connect data communication.

H. The target SET 307 acquires and stores the pseudo-ID or pseudonym-ID, which is transmitted thereto in step F, according to the ID mode. Further, the target SET 307 transmits an SUPL POS INIT message to the H-SLP 305. Dissimilar to the prior art, in an exemplary embodiment of the present invention, the target SET 307 does not include its own real ID in the SET session-ID. Instead, in step F, the H-SLC 303 includes the pseudo-ID or pseudonym-ID in the SET session-ID part of the session-ID.

I. The H-SLC 303 carries the SUPL POS INIT message in step H to the H-SPC 305 through PDATA. With regard to this, the H-SLC 303 includes the pseudo-ID or pseudonym-ID of the target SET 307 in the SET session-ID part of the session-ID included in the SUPL POS INIT message.

J. (optional step) If the H-SPC 305 cannot create a coarse position by using an LID of the SUPL POS INIT message included in the PDATA, it transmits a request for the coarse position to the H-SLC 303 by returning the LID through a PLREQ message.

K. (optional step) Upon receiving the PLREQ message as in step J, the H-SLC 303 creates a coarse position based on the returned LID, and then transmits the created coarse position to the H-SPC 305.

L. The target SET 307 performs a positioning process with the H-SPC 305 and the H-SLC 303. Details of the positioning process are the same as those of an SUPL POS specified in the OMA LOC AD SUPL V2_0 standard.

M. Upon completing positioning of the target SET 307, the H-SPC 305 transmits PDATA, including an SUPL END message to be sent to the target SET 307, to the H-SLC 303.

N. The H-SLC 303 transmits the SUPL END message to the target SET 307.

O. The H-SPC 305 transmits a posresult, that is, a positioning result, to the H-SLC 303.

P. The H-SLC 303 transmits the posresult to the SUPL Agent 301.

Figure 3:
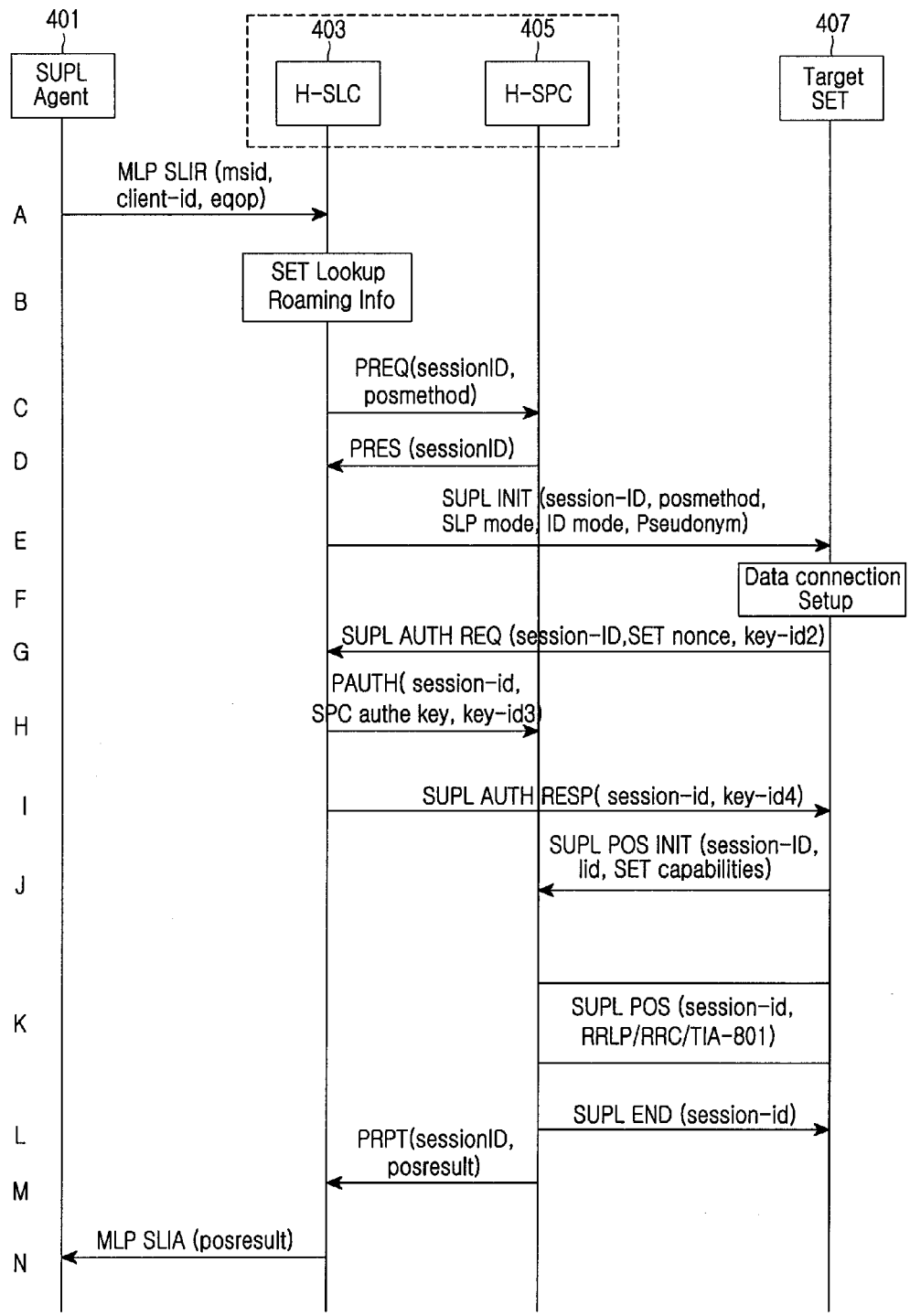
FIG. 3 is a flowchart illustrating an operational procedure in which a target SET and an H-SPC perform an SUPL POS process by exchanging messages therebetween without going through an H-SLC in accordance with another exemplary embodiment of the present invention.

FIG. 3 illustrates an operational procedure in a non proxy mode where a target SET and an H-SPC perform an SUPL POS process by exchanging messages directly therebetween without going through an H-SLC according to another exemplary embodiment of the present invention.

Steps A and B of the procedure are the same as those in FIG. 2.

C. An H-SLC 403 creates a pseudo-ID of a target SET 407. The pseudo-ID is used for identifying the corresponding target SET 407 when an H-SPC 405 performs positioning of the target SET 407. The reason why the pseudo-ID is used is that, if the real ID and location information of the target SET 407 are transmitted together in the course of positioning the target SET 407 and transmitting its location information, the location information of the target SET 407 is very likely to be hacked and thus the privacy of a user of the target SET 407 is violated. Thus, in consideration of this, the pseudo-ID is used so as to prevent the real ID from being transferred to the H-SPC 405 performing positioning of the target SET 407. The pseudo-ID may be a unique number created by the H-SLC 403.

Alternatively, the H-SLC 403 may use a pseudonym-ID by sending the real-ID (it is assumed herein that the real ID is an ms-ID, and the real ID is used pursuant to specifications of an SET session-ID defined in the OMA TS ULP V2.0 standard) to a Privacy Control Entity (PCE) and receiving a prearranged pseudonym-ID corresponding to the real ID from the PCE. The pseudonym-ID is used pursuant to specifications disclosed in the OMA PCP V1.0 standard. That is, the H-SLC 403 may create a pseudo-ID to be used when positioning of the target SET 407 is in progress, or may use the same pseudonym-ID as that specified in OMA PCP V1.0 standard. Further, the H-SLC 403 transmits a PREQ message to the H-SPC 405. With regard to this, the H-SLC 403 adds the pseudo-ID created in this step or the pseudonym-ID to an SET session ID of a session-ID included in the PREQ message, and then transmits the PREQ message. The session-ID includes an SLC session-ID and the SET session-ID. The H-SLC 403 creates the SLC session-ID by using its own ID and a unique number for identifying a session in progress by the H-SLC 403. Further, the H-SLC 403 transmits the PREQ message to the H-SPC 405 while filling the SET session-ID with the pseudo-ID or pseudonym-ID created in this step. The H-SLC 403 transmits posmethod, which is information on a positioning method to be used this time, to the H-SPC 405. The posmethod represents a protocol to be used for positioning and a positioning type. Details of the posmethod are the same as those of a posmethod specified in the OMA TS ULP V2_0 standard. The concrete configuration of the session-ID created by the H-SLC 403 according to this exemplary embodiment will be described below with reference to FIG. 5.

D. The H-SPC 405 acquires the pseudo-ID or pseudonym-ID of the target SET 407 by looking into the session-ID received from the H-SLC 403 in step C. The H-SPC 405 also acquires the posmethod transmitted by the H-SLC 403. Further, the H-SPC 405 transmits a PRES message accepting the PREQ to the H-SLC 403.

E. The H-SLC 403 informs the target SET 407 of the PREQ by transmitting an SUPL INIT message thereto. The SUPL INIT message includes the session-ID created in step C, the posmethod, and an SLP mode, which is specified in the OMA TS ULP V2_0 standard, for representing whether a positioning process follows a proxy mode or a non-proxy mode. In an exemplary embodiment of the present invention, the SUPL INIT message further includes an ID mode representing whether the real ID of the target SET 407 is used, or the pseudo-ID or pseudonym-ID transmitted by the H-SLC 403 is used when the target SET 407 uses the SET session-ID. Further, the H-SLC 403 carries the pseudo-ID or pseudonym-ID created in step C to the target SET 407 through the SUPL INIT message. Although not illustrated in the drawing, the SUPL INIT message carries a key (key-ID1) which the target SET 407 can use for authentication and so forth.

F. The target SET 407 attempts to connect data communication.

G. The target SET 407 perceives a non-proxy mode in which it communicates directly with the H-SPC 405. Further, the target SET 407 transmits an SUPL Authentication request (SUPL AUTH REQ) message to the H-SLC 403. With regard to this, the target SET 407 includes the pseudo-ID or pseudonym-ID, which is assigned by the H-SLC 403 in step E, in the SET session-ID part of the session-ID included in the SUPL AUTH REQ message. The SUPL AUTH REQ message also includes a key of the target SET 407 (key-ID2).

H. The H-SLC 403 transmits an SUPL Authentication (SUPL AUTH) message to the H-SPC 405. The session-ID used in the SUPL AUTH message contains the pseudo-ID or pseudonym-ID of the target SET 407. Further, the SUPL AUTH message includes a key (key-ID3) that is used for authenticating the target SET 407 when the H-SPC 405 receives a message from the target SET 407 in step J as will be described soon.

I. The H-SLC 403 transmits a key (key-ID4), which was used when it transmitted the SUPL INIT message, to the target SET 407.

J. The target SET 407 transmits an SUPL POS INIT message to the H-SPC 405. The session-ID includes in the SUPL POS INIT message contains the pseudo-ID or pseudonym-ID of the target SET 407.

K. The H-SPC 405 and the target SET 407 perform a positioning process.

L. Upon completing positioning of the target SET 407, the H-SPC 405 transmits SUPL END message to the target SET 407.

M. The H-SPC 405 transmits a posresult, that is, a positioning result, to the H-SLC 403.

N. The H-SLC 403 transmits the posresult to an SUPL Agent 401.

Figure 4:
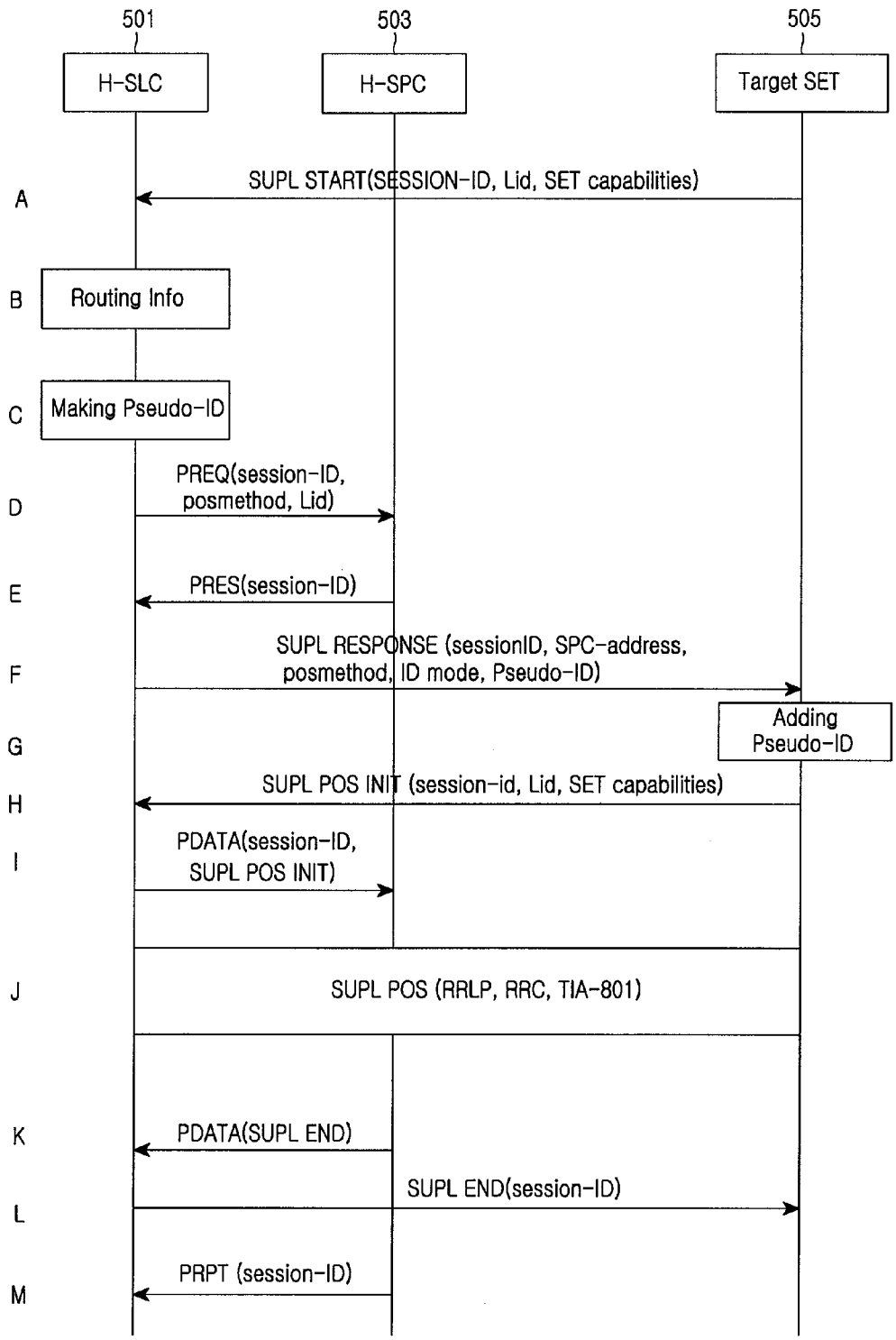
FIG. 4 is a flowchart illustrating a procedure of positioning a target SET when the target SET requests an H-SLC to provide its own location information in accordance with an exemplary embodiment of the present invention.

In FIGS. 2 and 3, a description has been given of a case where a third party (SUPL Agent) requests a location server (SLP) to perform positioning of a target terminal (target SET). However, in exemplary implementation, a target terminal may request a location server (SLP) to provide its own location information. FIG. 4 is a flowchart illustrating a procedure of positioning a target SET in such a case according to an exemplary embodiment of the present invention.

Reference will now be made to this procedure with reference to FIG. 4.

A. A target SET 505 transmits an SUPL START message for starting a location information providing service to an H-SLC 501 in order to obtain its own location information. The SUPL START message includes a session-ID, and the session ID contains the real ID of the target SET 505.

B. The H-SLC 501 looks into an LID (Location ID: e.g., cell ID) transmitted by the target SET 505 to thereby determine if the target SET 505 is roaming.

C. The H-SLC 501 creates a pseudo-ID or pseudonym-ID which enables the H-SLC 501 and an H-SPC 503 to identify the target SET 505 in a positioning process. Here, the H-SLC 501 may use a pseudo-ID or pseudonym-ID created using any unique number, or may acquire a pseudo-ID or pseudonym-ID by requesting a Privacy Control Entity (PCE) to provide it thereto. A way to acquire a pseudo-ID or pseudonym-ID by using a PCE is the same as that specified in the OMA PCP V1.0 standard.

D. The H-SLC 501 includes the pseudo-ID or pseudonym-ID acquired in step C in an SET session-ID part of the session-ID. Further, the H-SLC 501 transmits a PREQ message, which includes a posmethod selected by itself and the LID transmitted by the target SET 505, to the H-SPC 503. The posmethod refers to information on a positioning method to be used by the H-SPC 503 and the target SET 505 in a positioning process.

E. In response to the PREQ message, the H-SPC 503 transmits a PRES message to the H-SLC 501. In this step, the H-SPC 503 acquires the pseudo-ID or pseudonym-ID from the session-ID received in step D.

F. The H-SLC 501 transmits the session-ID to the target SET 505 through an SUPL RES message. Here, the SET session-ID part of the session-ID included in the SUPL RES message is substituted by the pseudo-ID or pseudonym-ID created by the H-SLC 501 in step C. An ID mode included in the SUPL RES message indicates that the target SET 505 is required to use the pseudo-ID or pseudonym-ID in the SET session-ID part of the session-ID. Further, the H-SLC 501 transfers the pseudo-ID or pseudonym-ID to the target SET 505.

G. The target SET 505 looks into the ID mode, and inserts the pseudo-ID or pseudonym-ID, instead of its own real ID, into the SET session-ID part of the session-ID according to the indication of the ID mode.

H. The target SET 505 transmits an SUPL POS INIT message to the H-SLC 501.

I. The H-SLC 501 carries the SUPL POS INIT message to the H-SPC 503 through PDATA.

J. Positioning messages exchanged between the H-SPC 503 and the target SET 505 are transmitted via the H-SLC 501. This is the case where the H-SLC 501 acts as a proxy, that is, the case of a proxy mode. In contrast with this, in the case of a non-proxy mode, the H-SPC 503 is connected directly with the target SET 505 while the H-SLC 501 does not act as a go-between.

Although the case of the non-proxy mode is not described in this exemplary embodiment, it is obvious that the gist of the present invention may be applied to the case of the non-proxy mode. That is, even in the case of the non-proxy mode, the H-SLC creates a pseudo-ID or pseudonym-ID, and the H-SPC 503 identifies the target SET 505 in a positioning process by using the pseudo-ID or pseudonym-ID.

K. Upon completing positioning of the target SET 505, the H-SPC 503 carries an SUPL END message, which is to be sent to the target SET 505, on PDATA, and then transmits the PDATA to the H-SLC 501.

L. The H-SLC 501 transmits the SUPL END message to the target SET 505.

M. The H-SPC 503 informs the H-SLC 501 of session ending by transmitting a PRPT message thereto.

FIGS. 5A to 5D illustrate the concrete configuration of a session-ID that is created by an H-SLC according to an exemplary embodiment of the present invention as described above.

FIG. 5A illustrates the configuration of the session-ID used in FIGS. 2, 3 and 4.

The session-ID is an identity used in messages exchanged between an SLC, an SPC and a target SET. This session-ID enables each entity to identify messages exchanged with other entities, and helps entities to exchange their IDs therebetween.

FIG. 5B illustrates the configuration of an SET session-ID. In the present invention, a virtual ID, that is, a pseudo-ID or pseudonym-ID, is used as the value of a SET session-ID. The pseudo-ID is a unique ID arbitrarily created by an SLC, and the pseudonym-ID is an ID provided by a PCE (it stores the privacy profile of a target SET, and if a location server requests a pseudonym-ID of the target SET, creates a pseudonym-ID and transfers it to the location server, or retrieves a predetermined pseudonym-ID stored therein and transfers it to the location server).

FIG. 5C illustrates parameters of a session-ID used in an SLC and information elements included in detailed information.

FIG. 5D illustrates an example of a case where a session-ID parameter is an ID mode. The SET session-ID of a target SET is included in the session-ID of an SUPL POS INIT message which the target SET transmits to an SLC or SPC. According to an ID mode transmitted by the SLC, the target SET determines whether it represents the value of the SET session-ID by using its own real ID or by using a pseudo-ID or pseudonym-ID.

Further, although the aforementioned exemplary embodiments of the present invention have been described based on the assumption that a target SET is located in a home network (i.e., positioning of a target SET is performed only through an H-SLC and an H-SPC constituting an H-SLP), an exemplary embodiment of the present invention may be applied when a target SET is roaming out of a home network. Hereinafter, a description will be given of an exemplary embodiment of the present invention, which can be applied in such a case, that is, when a target SET moves out of a home network.

In general, when a target SET, for which positioning is to be performed, moves out of a home network and is located in an external network, a location server (home location server) existing in the home network performs positioning of the roaming target SET by the aid of a location server (visitor location server) existing in the external network in which the target SET is currently located. In the process of such positioning, the home location server transfers the unique ID (e.g., IMSI, MSISDN, etc.) of the target SET to the visitor location server so as to use it as an ID for identifying the corresponding target SET.

Figure 6:
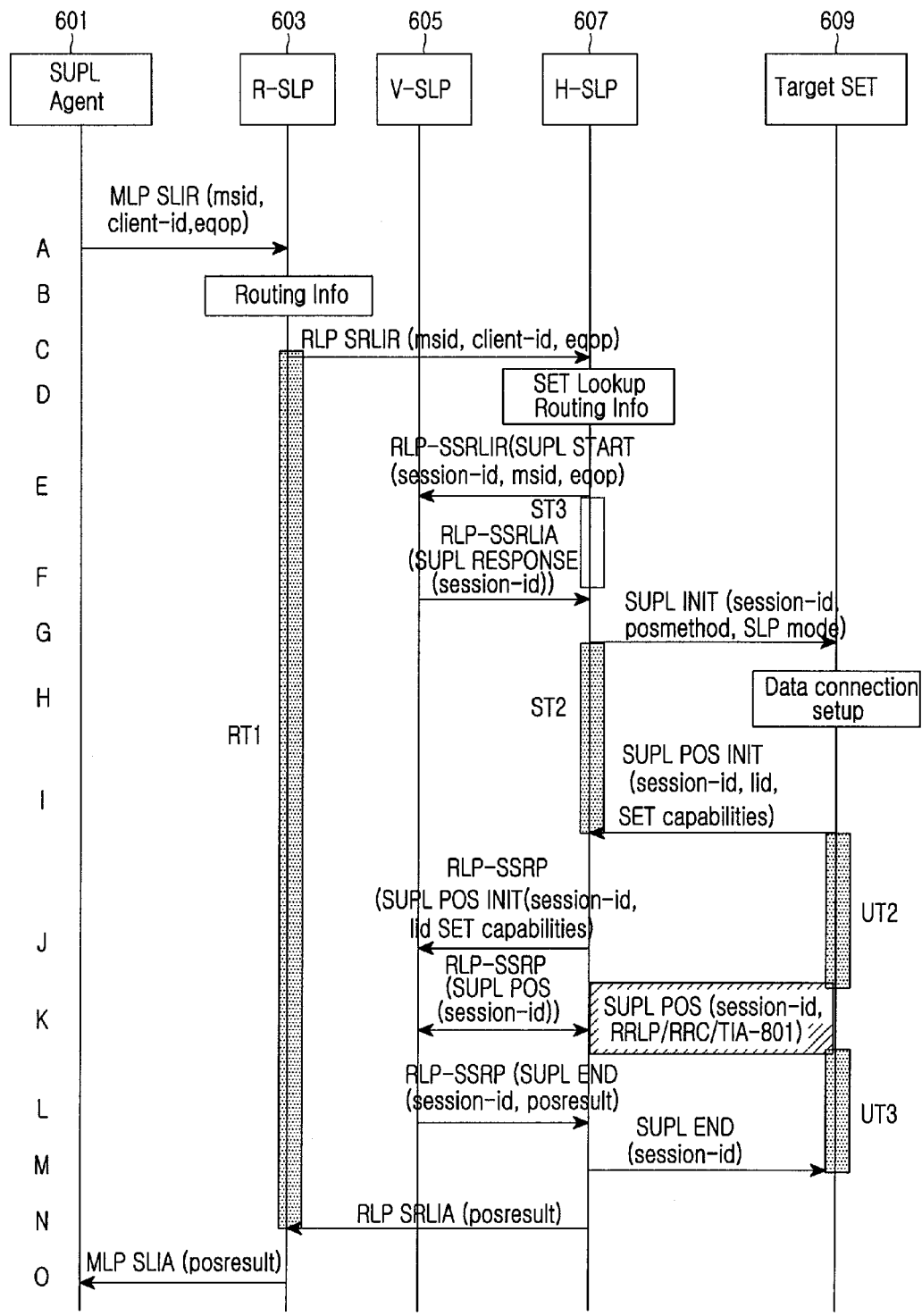
FIG. 6 is a flowchart illustrating a conventional procedure of positioning a target SET when the target SET is roaming out of a home network.

FIG. 6 is a flowchart illustrating a conventional procedure of positioning a target SET when the target SET is roaming out of a home network. In FIG. 6, a Requested-SUPL Location Platform (R-SLP) 603 denotes an SLP that receives a request for positioning of a target SET 609 from an SUPL Agent 601 and transfers a positioning result to the SUPL Agent 601, and a Visited-SUPL Location Platform (V-SLP) 605 an SLP existing in a network in which the target SET 609 is currently located.

Referring to FIG. 6, the conventional procedure of positioning a target SET when the target SET is roaming out of a home network includes the following steps:

A. An SUPL Agent 601 requests an R-SLP 603 to start a location service by transmitting a Mobile Location Protocol Start Location Immediate Request (MLP SLIR) message to the R-SLP 603. The MLP SLIR message includes the real ID (e.g., ms-ID) of a target SET 609, a client-ID (i.e., ID of the SUPL Agent 601), and QoP representing the quality level of the requested location service. The R-SLP 603 determines if the SUPL Agent 601 has the authority to request the location service.

B. If the SUPL Agent 601 has the authority to request the location service, the R-SLP 603 searches for an H-SLP 607 of the target SET 609 by using the real ID (e.g., ms-ID) of the target SET 609.

C. The R-SLP 603 transmits a location request message to the searched H-SLP 607. Here, the location request message may be implemented by a Roaming Location Protocol SUPL Roaming Location Initiation Request (RLP SRLIR) message using an RLP protocol.

D. Then, using the real ID of the target SET 609, the H-SLP 607 determines if the target SET 609 is roaming out of its home network.

E. When the target SET 609 is roaming, the H-SLP 607 transmits a SUPL Start Roaming Location Initiation Request (RLP SSRLIR) message for starting positioning of the roaming target SET 609 to a V-SLP 605. Further, the H-SLP 607 creates an SUPL Start message while leaving an SET session ID part of the SUPL Start message empty. In this way, the H-SLP 607 informs the V-SLP 605 that this session corresponds to a Network Initiated case.

F. Upon completing preparation for the requested SUPL positioning, the V-SLP 605 transmits a Roaming Location Protocol SUPL Start Roaming Location Initiation Answer (RLP SSRLIA) message to the H-SLP 607.

G. The H-SLP 607 transmits an SUPL Initiation (SUPL INIT) message for requesting location session initiation using SUPL to the target SET 609 through WAP PUSH or SMS. The SUPL INIT message includes a session-ID for representing a session generated between the H-SLP 607 and the target SET 609. Here, the session-ID includes an SLP session-ID part for the H-SLP 607 and an SET session-ID part for the target SET 609. The SLP session-ID part of them may be a session-ID sequentially created by the H-SLP 607 or identity information indicating the H-SLP 607. Internet Protocol (IP) address information or Fully Qualified Domain Name (FQDN) information may be used as the identity information. Further, the SET session-ID part may be a session-ID sequentially created by the target SET 609 or a unique identity indicating the target SET 609. A unique MSISDN, MDN, IMSI, IP address information, etc. may be used as the unique identity. Further, the SUPL INIT message includes a posmethod, that is, information on positioning methods supportable by the H-SLP 607 and protocols. Further, the SUPL INIT message may include an SLP mode representing whether an SLP for performing positioning of the target SET 609 corresponds to a proxy mode or a non-proxy mode. Discrimination between the proxy mode and the non-proxy mode depends on whether or not an SLP is divided into an SPC and an SLC, and a session is independently created.

H. Upon receiving the SUPL INIT message, the target SET 609 starts to connect data communication.

I. The target SET 609 transmits an SUPL POS INIT message to the H-SLP 607. This message includes the session-ID, an LID containing information on a network in which the target SET 609 is currently located, and SET capability. Here, the LID denotes a Location ID, and a cell ID or an access ID of Wireless Local Area network) may be used as its value. The SET capability contains a posmethod, that is, information on positioning methods supportable by the target SET 609 and protocols.

J. The H-SLP 607 transmits the SUPL POS INIT message, which is transmitted by the target SET 609, to the V-SLP 605 through a Roaming Location Protocol-SUPL Start Roaming Position (RLP-SSRP) message.

K. The V-SLP 605 compares the SET capability of the SUPL POS INIT message included in the RLP-SSRP message with positioning methods supportable by itself, and finally determines a positioning method and a protocol to be used in the current session. The determined positioning method and the protocol are transferred to the target SET 609. Further, the V-SLP 605 and the target SET 609 exchange messages necessary in the process of positioning. With regard to this, the H-SLP 607 acts as an intermediary for the delivery of the messages exchanged between the target SET 609 and the V-SLP 605.

L. Upon completing positioning of the target SET 609, the V-SLP 605 transmits a positioning result of the target SET 609 and an SUPL END message, which is to be sent to the target SET 609, to the H-SLP 607.

M. The H-SLP 607 transfers the SUPL END message to the target SET 609. Further, the H-SLP 607 and the target SET 609 terminate the session in progress.

N. The H-SLP 607 transmits the positioning result of the target SET 609 to the R-SLP 603.

O. The R-SLP 603 transmits the positioning result of the target SET 609 to the SUPL Agent 601.

In the conventional positioning procedure according to the aforementioned exemplary embodiment of the present invention, although an H-SLP uses a virtual ID, that is, a pseudo-ID or pseudonym-ID, for positioning a target SET, the real ID of the target SET is transmitted to a V-SLP through an external network when the target SET is roaming in the external network. Thus, since the real ID and location information of the target SET are simultaneously used by an entity on the external network, such as the V-SLP and the like, the privacy of a user of the target SET is very likely to be violated. Therefore, the following exemplary embodiment (hereinafter referred to as "variant embodiment") of the present invention proposes a way to protect the privacy of a user of the target SET even in such a case.

In the variant embodiment of the present invention, when a target SET is roaming from a home network to an external network, an H-SLP requests a V-SLP to perform positioning of the target SET. To this end, the H-SLP transfers an ID for identifying the corresponding target SET to the V-SLP. This ID is an ID temporarily assigned by the H-SLP. The H-SLP performs an operation of mapping the real ID of the target SET to a virtual ID, that is, a pseudo-ID or pseudonym-ID, and matches the real ID to the pseudo-ID or pseudonym-ID during positioning of the target SET. Thus, when positioning of the target SET is performed during the roaming of the target SET, the H-SLP transfers a temporary ID according to the pseudo-ID or pseudonym-ID to the V-SLP, thereby preventing the real ID of the target SET from being transferred to the outside of the home network. Reference will now be made to the variant embodiment of the present invention with reference to FIG. 7.

Figure 7:
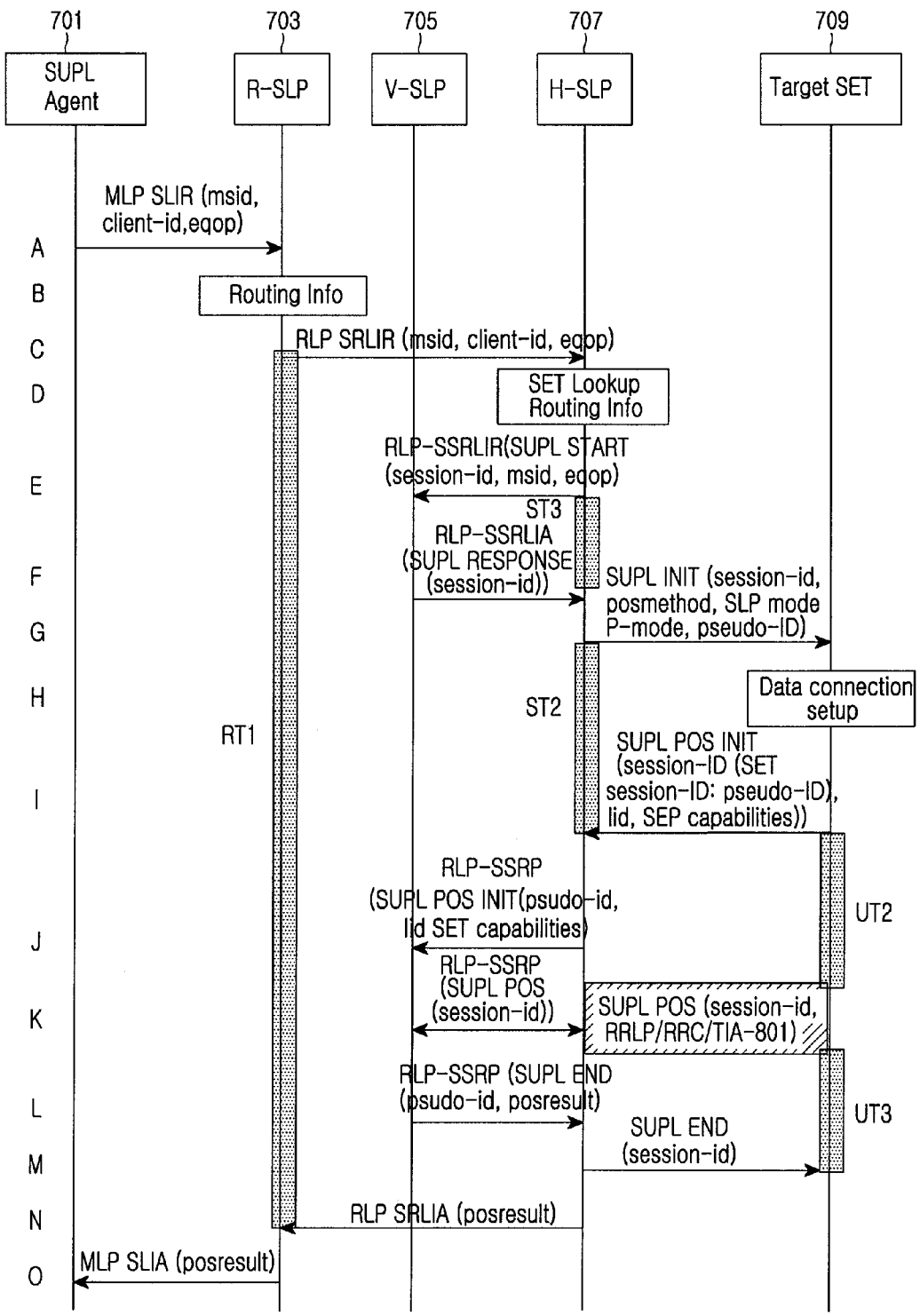
FIG. 7 is a flowchart illustrating a procedure of positioning a target SET when the target SET is roaming out of a home network in accordance with an exemplary embodiment of the present invention.

Referring to FIG. 7, a procedure according to the variant embodiment of the present invention includes the following steps:

A. An SUPL Agent 701 requests an R-SLP 703 to start a location service by transmitting an MLP SLIR message to the R-SLP 703. The MLP SLIR message includes the real ID (e.g., ms-ID) of a target SET 709, a client-ID (i.e., ID of the SUPL Agent 701), and QoP representing the quality level of the requested location service. The R-SLP 703 determines if the SUPL Agent 701 has the authority to request the location service.

B. If the SUPL Agent 701 has the authority to request the location service, the R-SLP 703 searches for an H-SLP 707 of the target SET 709 by using the real ID (e.g., ms-ID) of the target SET 709.

C. The R-SLP 703 transmits a location request message to the searched H-SLP 707. Here, the location request message may be implemented by an RLP SRLIR message using an RLP protocol.

D. Then, using the real ID of the target SET 709, the H-SLP 707 determines if the target SET 709 is roaming out of its home network. When the target SET 709 is roaming, the H-SLP 707 creates a pseudo-ID or pseudonym-ID in order to prevent the real ID of the target SET 709 from being exposed to a network external to the home network. The H-SLP 707 uses the created pseudo-ID or pseudonym-ID until the currently connected session ends, and stores mapping information for the pseudo-ID or pseudonym-ID and the real ID. Subsequently, the H-SLP 707 performs an operation of mapping the real ID to the pseudo-ID or pseudonym-ID. The H-SLP 707 does not transfer the real ID of the target SET 709 to all connected entities when positioning of the target SET 709 is performed, and the pseudo-ID or pseudonym-ID temporarily created by the H-SLP 707 is used in the whole positioning process. In the present invention, when the target SET 709 is roaming, the pseudo-ID or pseudonym-ID is transferred to a V-SLP 705 existing in a visited network in which the target SET 709 is currently located. However, it is obvious that the real ID of the target SET 709 may not be transferred, but the temporarily created pseudo-ID or pseudonym-ID of the target SET 709 may be used even in cases other than the roaming case, for example, when the H-SLP 707 communicates with an external entity existing outside of the home network.

E. The H-SLP 707 transmits an RLP SSRLIR message for starting positioning of the roaming target SET 709 to the V-SLP 705. Further, the H-SLP 707 creates an SUPL Start message while leaving an SET session ID part of the SUPL Start message empty. In this way, the H-SLP 707 informs the V-SLP 705 that this session corresponds to a Network Initiated case.

F. Upon completing preparation for the requested SUPL positioning, the V-SLP 705 transmits an RLP SSRLIA message to the H-SLP 707.

G. The H-SLP 707 transmits an SUPL INIT message for requesting location session initiation using SUPL to the target SET 709 through WAP PUSH or SMS. The SUPL INIT message includes a session-ID for representing a session generated between the H-SLP 707 and the target SET 709. Here, the session-ID includes an SLP session-ID part for the H-SLP 707 and an SET session-ID part for the target SET 709. The SLP session-ID part of them may be a session-ID sequentially created by the H-SLP 707 or identity information indicating the H-SLP 707. IP address information or Fully Qualified Domain Name (FQDN) information may be used as the identity information. Further, the SET session-ID part may be a session-ID sequentially created by the target SET 709 or a unique identity indicating the target SET 709. A unique MSISDN, MDN, IMSI, IP address information, etc. may be used as the unique identity. In step D, the H-SLP 707 is already aware that the target SET 709 is roaming out of the home network. Thus, the H-SLP 707 creates a pseudo-ID or pseudonym-ID as a virtual ID, and transmits the virtual ID to the target SET 709 through the SUPL INIT message. In transmitting the virtual ID, the H-SLP 707 may insert the created virtual ID directly into the SET session-ID part of the session-ID included in the SUPL INIT message or include the virtual ID in a separate region of the SUPL INIT message. In order to inform the target SET 709 that the virtual ID must be used during the currently connected session, the H-SLP 707 may include a P-mode parameter in the SUPL INIT message. The P-mode instructs the target SET 709 to use the virtual ID instead of its own real ID. The P-mode is 1 bit or 1 byte in size. The virtual ID is used when the P-mode has a value of 1, and the real ID is used when the P-mode has a value of 0. The SUPL INIT message also includes a posmethod, that is, information on positioning methods supportable by the H-SLP 707 and protocols. Further, the SUPL INIT message may include an SLP mode representing whether an SLP for performing positioning of the target SET 709 corresponds to a proxy mode or a non-proxy mode. Discrimination between the proxy mode and the non-proxy mode depends on whether or not an SLP is divided into an SPC and an SLC, and a session is independently created.

H. Upon receiving the SUPL INIT message, the target SET 709 starts to connect data communication.

I. The target SET 709 transmits an SUPL POS INIT message to the H-SLP 707. This message includes the session-ID, an LID containing information on a network in which the target SET 709 is currently located, and SET capability. The target SET 709 inserts the virtual ID, which is included in the SUPL INIT message, into the SET session-ID part of the session-ID included in the SUPL POS INIT message. Further, the target SET 709 checks the P-mode transmitted by the H-SLP 707. For example, if the P-mode has a value of 0, the target SET 709 uses the virtual ID during the currently connected session while concealing its own real ID. The target SET 709 uses the virtual ID in the subsequent transmissions of all messages, instead of its own real ID. Further, the target SET 709 transmits the SUPL POS INIT message in which the virtual ID is included. This message includes the session-ID into which the virtual ID is inserted, the LID containing information on a network in which the target SET 709 is currently located, and the SET capability. Here, the LID denotes a Location ID, and a cell ID or an access ID of Wireless Local Area Network (WLAN) or WiMAX may be used as its value. The SET capability contains a posmethod, that is, information on positioning methods supportable by the target SET 709 and protocols.

J. The H-SLP 707 transmits the SUPL POS INIT message, which is transmitted by the target SET 709, to the V-SLP 705 through an RLP-SSRP message.

K. The V-SLP 705 compares the SET capability of the SUPL POS INIT message included in the RLP-SSRP message with positioning methods supportable by itself, and finally determines a positioning method and a protocol to be used in the current session. The determined positioning method and the protocol are transferred to the target SET 709. Further, the V-SLP 705 and the target SET 709 exchange messages necessary in the process of positioning. With regard to this, the H-SLP 707 acts as an intermediary for the delivery of the messages exchanged between the target SET 709 and the V-SLP 705.

L. Upon completing positioning of the target SET 709, the V-SLP 705 transmits a positioning result of the target SET 709 and an SUPL END message, which is to be sent to the target SET 709, to the H-SLP 707.

M. The H-SLP 707 transfers the SUPL END message to the target SET 709. Further, the H-SLP 707 and the target SET 709 terminate the current session.

N. The H-SLP 707 retrieves the real ID corresponding to the virtual ID of the target SET 709 from the currently stored mapping information (e.g., mapping table), and transmits the positioning result of the target SET 709 to the R-SLP 703. The R-SLP 703 transmits the positioning result of the target SET 709 to the SUPL Agent 701.

Figure 8:
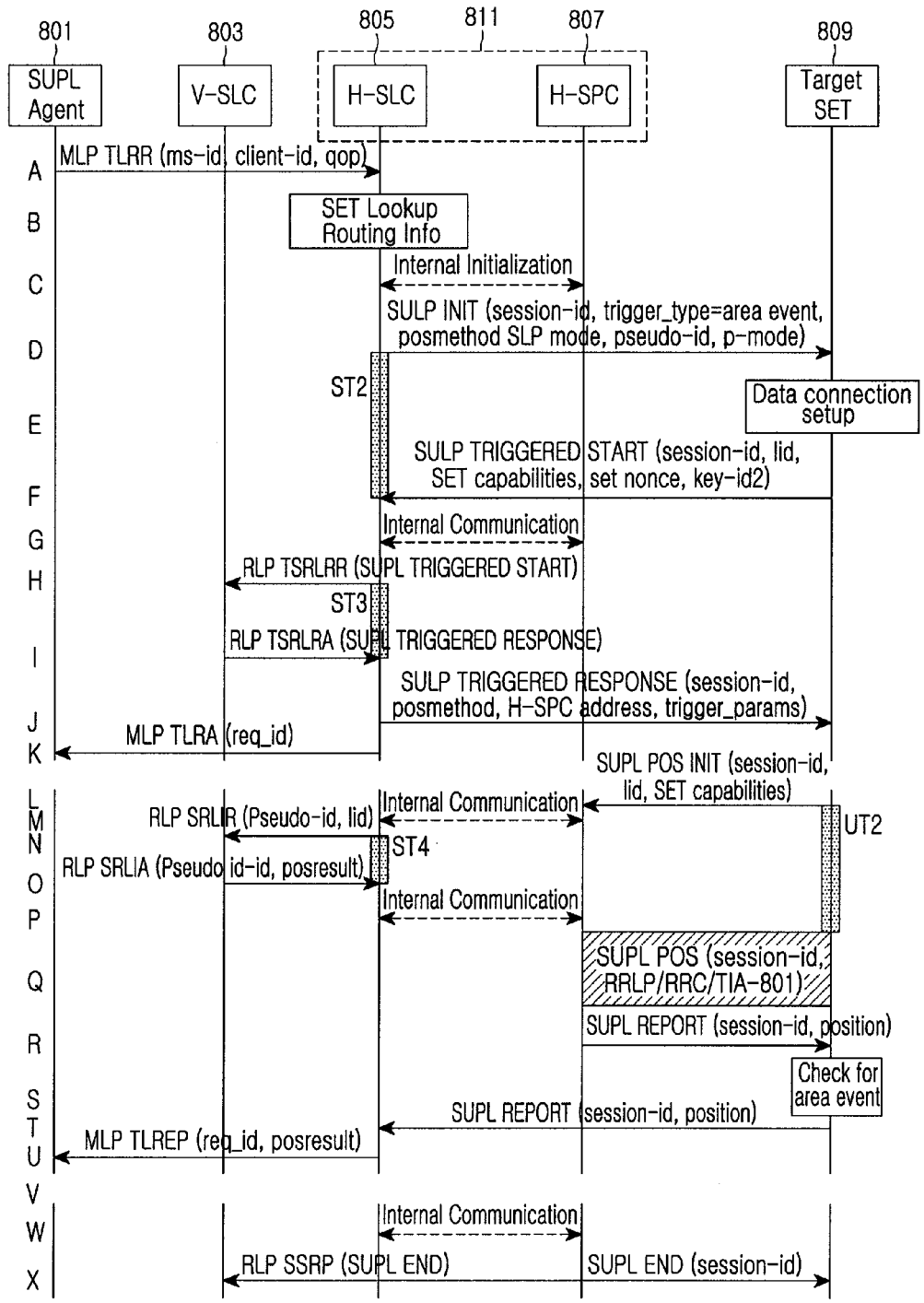
FIG. 8 is a flowchart illustrating a procedure of positioning a target SET when a triggered service is requested in a state where the target SET is roaming out of a home network in accordance with another exemplary embodiment of the present invention.

Although the aforementioned description has been given on the assumption that positioning of a target SET is performed only once, there may be a case where positioning is performed a number of times. This is the case of a triggered service. In the case of the triggered service, an event is considered to occur when a target SET enters or leaves a specific place appointed by a service requestor or when a predetermined period expires, according to which positioning of the target SET is performed and a positioning result is provided to the service requestor. Of course, the present invention can also be applied to such a triggered service. FIG. 8 illustrates a procedure of positioning a target SET when a triggered service is requested according to an exemplary embodiment of the present invention. Referring to FIG. 8, the procedure according to this exemplary embodiment includes the following steps:

A. A SUPL Agent 801 transmits an MPL TLRR message to an H-SLP 811 in order to start a triggered service. The MPL TLRR message includes the real ID (e.g., ms-ID) of a target SET 809, a client-ID (i.e., ID of the SUPL Agent 801), and QoP representing the quality level of the requested triggered service.

B. Using the real ID of the target SET 809, the H-SLP 811 determines if the target SET 809 is roaming When the target SET 809 is roaming, an H-SLC 805 of the H-SLP 811 creates a virtual ID in order to prevent the real ID of the target SET 809 from being exposed to a network external to the home network. Here, a pseudo-ID or pseudonym-ID may be used as the virtual ID. The H-SLC 805 uses the created virtual ID until the currently connected session ends, and stores mapping information for the virtual ID and the real ID. Further, the H-SLC 805 of the H-SLP 811 transfers the virtual ID temporarily created by itself, instead of the real ID of the target SET 809, to all connected entities when positioning of the target SET 809 is performed. In this exemplary embodiment, since it is assumed that the target SET 809 is roaming in a visited network, the H-SLC 805 transfers the virtual ID to an SLP existing in the visited network, that is, a V-SLP (V-SLC 803 or V-SPC). However, it is obvious that the H-SLP 811 may create a virtual ID of the target SET 809 in a similar manner and use it instead of the real ID of the target SET 809 in cases other than the roaming case, that is, when the real ID of the target SET 809 need not be transferred, for example, when the H-SLP 811 communicates with an external entity existing outside of the home network. Further, although the H-SLP 811 creates a virtual ID of the target SET 809 in this exemplary embodiment, it is obvious that an entity (e.g., target SET itself) other than the H-SLP 811 may create a virtual ID of the target SET 809 and use it instead of the real ID of the target SET 809 in the process of positioning. Of course, a third authorized entity may also create a virtual ID of the target SET 809, and manage the virtual ID and the real ID.

C. Upon receiving a triggered location service request from the SUPL Agent 801, the H-SLC 805 transfers it to an H-SPC 807. With regard to this, the H-SLC 805 transfers the created virtual ID, instead of the real ID of the target SET 809, to the H-SPC 807. The virtual ID may be subsequently used for identifying the target SET 809.

D. The H-SLC 805 transmits an SUPL INIT message to the target SET 809 through WAP PUSH or SMS, thereby informing the target SET 809 that location information providing service using SUPL starts. The SUPL INIT message includes a session-ID for representing a session generated between the H-SLC 805 and the target SET 809. Here, the session-ID includes an SLP session-ID part and an SET session-ID part. The SLP session-ID part of them may be a session-ID sequentially created by the H-SLC 805 or identity information indicating the H-SLC 805. IP address information or Fully Qualified Domain Name (FQDN) information may be used as the identity information. Further, the SET session-ID part may be a session-ID sequentially created by the target SET 809 or a unique identity indicating the target SET 809. A unique MSISDN, MDN, IMSI, IP address information, etc. may be used as the unique identity. Further, the H-SLC 805 creates a virtual ID and carries it to the target SET 809 through the SUPL INIT message. Here, the virtual ID is a temporary ID of the target SET 809, which is created when the H-SLC 805 determines in step B that the target SET 809 is roaming out of the home network. In carrying the virtual ID to the target SET 809, the H-SLC 805 may insert the virtual ID directly into the SET session-ID part of the session-ID included in the SUPL INIT message or include the virtual ID in a separate region of the SUPL INIT message. In order to inform the target SET 809 that the virtual ID must be used during the currently connected session, the H-SLC 805 may include a P-mode parameter in the SUPL INIT message. The P-mode is used for indicating whether or not the target SET 809 must transmit messages by using the virtual ID instead of its own real ID. For example, the P-Mode may be set in such a manner that the virtual ID is used when the P-mode has a value of 1, and the real ID is used when the P-mode has a value of 0. The SUPL INIT message also includes a posmethod, that is, information on positioning methods supportable by the H-SLC 805 and protocols. Further, the SUPL INIT message may include an SLP mode parameter representing whether an SLP for performing positioning of the target SET 809 corresponds to a proxy mode or a non-proxy mode. Discrimination between the proxy mode and the non-proxy mode depends on whether or not an SLP is divided into an SPC and an SLC, and a session is independently created.

E. Upon receiving the SUPL INIT message, the target SET 809 establishes data communication connection.

F. The target SET 809 transmits an SUPL TRIGGERED START message to the H-SLC 805. The target SET 809 determines whether or not to use the virtual ID through the P-mode parameter that is included in the SUPL INIT message in step D. If the target SET 809 is to use the virtual ID, it stores the virtual ID included in the SUPL INIT message, and inserts the virtual ID, instead of the real ID, into the SET session ID part of the session-ID included in the SUPL TRIGGERED START message. The SUPL TRIGGERED START message also includes an LID representing information on a network in which the target SET 809 is currently located (e.g., cell ID). In addition, the SUPL TRIGGERED START message includes SET capability containing information on positioning methods supportable by the target SET 809 and protocols. Further, the SUPL TRIGGERED START message may include SET nonce and key ID2 that are used when the target SET 809 is connected directly with an SPC in the course of performing positioning of the target SET 809.

G. Using the SET nonce and key ID2, the H-SLC 805 creates a security key to be used when the H-SPC 807 authenticates the target SET 809, and vice versa.

H. The H-SLP 811 (H-SLC 805 when the H-SLP 811 comprises the H-SLC 805 and the H-SPC 807) searches for a location server existing in a network in which the target SET 809 is currently located, that is, a visited location server (V-SLC 803), by using the LID transmitted by the target SET 809 or in other ways. The H-SLP 811 transmits the SUPL TRIGGERED START message, which is transmitted by the target SET 809, to the V-SLC 803. Here, when the P-mode instructs the target SET 809 to use the virtual ID, the virtual ID is contained in the SET session-ID part of the session-ID included in the SUPL TRIGGERED START message. Therefore the V-SLC 803 existing in the external network can know only the virtual ID.

I. In response to the SUPL TRIGGERED START message, the V-SLC 803 transmits a Roaming Location Protocol Triggered Service Roaming Location report Answer (RLP TSR-LRA) message to the H-SLP 811.

J. The H-SLP 811 compares the SET capability transmitted by the target SET 809 in step F with positioning methods supportable by itself, and finally determines a positioning method and a protocol to be used in the current session. If the current SLP mode is a non-proxy mode, the H-SLP 811 transmits the address of the H-SPC 807 with which the target SET 809 is to create a session for positioning, and transmits conditions for the triggered service to the target SET 809. In step D, although the H-SLP 811 carries the virtual ID to be used in the process of positioning and the P-mode parameter to the target SET 809 through the SUPL INIT message, it may also carry them to the target SET 809 through an SUPL TRIGGERED RESPONSE message. This is because the SUPL INIT message carries the virtual ID and the P-mode before the target SET 809 approves of the triggered service. That is, if the target SET 809 receives the SUPL INIT message, but rejects the triggered service, the requested triggered service may not start. Thus, when a large amount of data including the virtual ID and the P-mode is transmitted to the target SET 809 through a radio environment in such a situation where whether or not the triggered service starts is not decided, a waste of resources may be caused. Therefore, in view of resource saving in a radio environment, it is more effective to transmit additional information (e.g., virtual ID, P-mode) related to the triggered service to the target SET 809 at a point of time when the target SET 809 approves of the triggered service, and the triggered service is decided to start. In the present invention, when the H-SLP 811 transmits the virtual ID and the P-mode to the target SET 809, it may use the SUPL INIT message or the SUPL TRIGGERED RESPONSE message for carrying them.

K. The H-SLP 811 transits a message informing that the triggered service requested by the SUPL Agent 801 is approved and starts, that is, a Mobile Location Protocol Triggered Location request Answer (MLP TLRA) message, to the SUPL Agent 801.

L. The target SET 809 transmits an SUPL POS INIT message to the H-SLP 811 in order to start positioning. This message includes an LID representing information on a network in which the target SET 809 is currently located. Further, the target SET 809 inserts the virtual ID transferred from the H-SLP 811 into the SET session-ID.

M. The H-SPC 807 transmits a request for a coarse position of the target SET 809 to the H-SLC 805 by using the LID. Here, as mentioned above, the coarse position refers to information about an actual geographic region corresponding to network information, such as an LID (e.g., place-name information for a current location, such as Seoul, Incheon, etc. or Gangnam-gu, Gangbuk-gu, etc.).

N. The H-SLC 805 transfers the LID to the V-SLC 803. This is due to the fact that although the H-SLC 805 acquires the LID of the target SET 809, it cannot create a coarse position corresponding to the LID because the target SET 809 is roaming in an external network. That is, although the H-SLC 805 is aware of, for example, the ID of a cell in which the target SET 809 is currently located, it cannot create a coarse position because it has no place-name information matched to the cell ID. Thus, the H-SLC 805 transfers the LID to the V-SLC 803 having place-name information matched to the LID. Further, the H-SLC 805 sets an ID for identifying the target SET 809 to the virtual ID that is created by the H-SLC 805 in step B or created by the H-SLP 811 just before the SUPL TRIGGERED RESPONSE message is transmitted, and transmits the virtual ID to the V-SLC 803.

O. The V-SLC 803 seeks the coarse position of the target SET 809 by using the received LID, and transfers a result thereof to the H-SLC 805. In transferring the result to the H-SLC 805, the virtual ID is used as the ID of the target SET 809.

P. The H-SLC 805 transfers the coarse position, which is received from the V-SLC 803, to the H-SPC 807. In transferring the coarse position to the H-SPC 807, the virtual ID created by the H-SLC 805 is also used as the ID of the target SET 809.

Q. The H-SPC 807 and the target SET 809 perform positioning of the target SET 809 by using the virtual ID as an identity and by using the coarse position information. For example, when an A-GPS method is employed for positioning the target SET 809 in this exemplary embodiment of the present invention, the coarse position information may be used as information for selecting GPS satellites participating in positioning of the target SET 809.

R. In an SET-assisted mode in which the H-SPC 807 performs positioning of the target SET 809, the H-SPC 807 transmits a positioning result to the target SET 809 to thereby determine if an event for the target SET 809 occurs.

S. The target SET 809 compares the current positioning result with a target area set as a triggered service condition to thereby determine if an area event occurs. The type of the area event includes leaving, entering, staying. Etc.

T. If the area event occurs, the target SET 809 informs the H-SLC 805 of the occurrence of the area event. With regard to this, the current positioning result may be transferred together to the H-SLC 805.

U. The H-SLC 805 informs the SUPL Agent 801 of the event occurrence. Just at this moment, the H-SLC 805 changes the virtual ID to the real ID of the target SET 809, and transfers the positioning result of the target SET 809 to the SUPL Agent 801.

As describe above, even in the case of a triggered service, an H-SLP uses a virtual ID instead of the real ID of a Target SET when it exchanges messages with an entity existing in an external network in the process of positioning of the target SET. Further, the H-SLP requests a V-SLP to provide a coarse position corresponding to an LID received from the target SET, and performs positioning of the target SET by using the coarse position received at its request. That is, when a target SET is roaming in an external network, an H-SLP according to an exemplary embodiment of the present invention performs the creation of a virtual ID, a matching operation, and the delivery of an LID to a V-SLC in which a coarse position corresponding to the LID is stored, even in the case of a triggered service.

Figure 9:
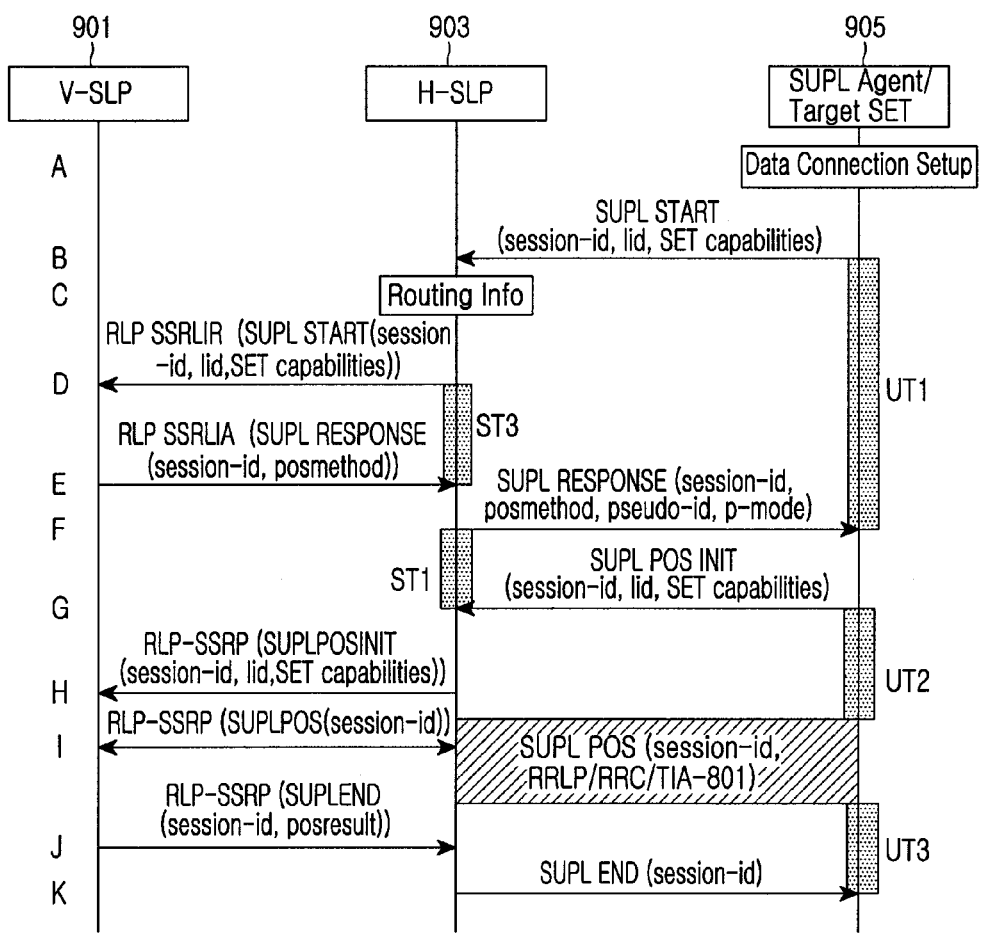
FIG. 9 is a flowchart illustrating a procedure of positioning a target SET when the target SET requests a location server to provide its own location information while roaming out of a home network in accordance with another exemplary embodiment of the present invention.

In FIGS. 7 and 8, a description has been given of a case where a third-party service requestor (SUPL Agent) requests an SLP (H-SLP or H-SLC) to perform positioning of a target SET. However, it is obvious that a target SET may request an SLP to provide its own location information. FIG. 9 is a flowchart illustrating a procedure of positioning a target SET in such a case, that is, when a target SET requests an SLP to provide its own location information while roaming in an external network. Referring to FIG. 9, the procedure includes the following steps:

A. A target SET 905, that is, an SUPL Agent, establishes data communication in order to obtain its own location information.

B. The target SET 905 transmits an SUPL START message to an H-SLP 903 in order to request its own location information. In transmitting the SUPL START message, the target SET 905 inserts its real ID into the SET session-ID part of the session-ID included in the SUPL START message. The SUPL START message also includes an LID representing information on a network in which the target SET 905 is currently located. Further, the target SET 905 transmits SET capability, which represents positioning methods supportable by itself and protocols, to the H-SLP 903 through the SUPL START message.

C. Upon receiving the message from the target SET 905, the H-SLP 903 determines if the target SET 905 is roaming out of a home network. When the target SET 905 is roaming, the H-SLP 903 creates a virtual ID of the target SET 905 because an entity (e.g., V-SLP 901) external to the home network must be used for positioning of the target SET 905. The H-SLP 903 further creates mapping information (e.g., mapping table) for mapping the virtual ID to the real ID of the target SET 905, and stores it until a session allocated to the current location service request ends. The H-SLP 903 functions to converting the real ID and virtual ID of the target SET 905 into each other. Thus, the virtual ID created by the H-SLP 903 is a temporary value for indicating the ID of a specific terminal in a specific session. Although the H-SLP 903 takes charge in an operation of creating a virtual ID of the target SET 905 and mapping the created virtual ID to the real ID of the target SET 905 in this exemplary embodiment of the present invention, it is obvious that an entity other than the H-SLP 903 (e.g., the target SET 905 itself) may functions to create, map and manage a virtual ID. Alternatively, an external entity (e.g., V-SLP 901) authorized by the H-SLP 903 may create and map a virtual ID, that is, a temporary ID for identifying the target SET 905 in the currently connected session. Even in such a case, a separate method for preventing the real ID of the target SET 905 from being transferred to an unauthorized external entity may be used (e.g., encryption method, etc.).

D. Since the target SET 905 is roaming, the H-SLP 903 transmits a message (RLP SSRLIR message) corresponding to the location service request message (SUPL START message), which is received from the target SET 905, to the V-SLP 901, that is, an SLP existing in a network in which the target SET 905 is currently located. In transmitting this message, the H-SLP 903 inserts the virtual ID created by itself, instead of the real ID of the target SET 905, into the SET session-ID part of the session-ID included in the SUPL STASRT message. Alternatively, an entity authorized by the H-SLP 903 may create a virtual ID, or the target SET 905 itself may create a virtual ID and transmit it to the H-SLP 903. The case where the target SET 905 itself creates a virtual ID and transmits it to the H-SLP 903 will be below with reference to FIG. 10.

E. In response to the corresponding location service request, the V-SLP 901 transmits a message (RLP SSRLIA message) to the H-SLP 903.

F. The H-SLP 903 transmits an SUPL RESPONSE message to the target SET 905, in response to the SUPL START message received in step B. The SUPL RESPONSE message transmitted by the H-SLP 903 includes the created virtual ID and a P-mode parameter instructing the target SET 905 to use the virtual ID, instead of its own real ID, for subsequent message transmissions.

G. The target SET 905 transmits an SUPL POS INIT message to the H-SLP 903 in order to initiate a positioning process. In transmitting this message, when the P-mode parameter existing in the SUPL RESPONSE message received in step F indicates to use the virtual ID, the target SET 905 inserts the virtual ID, instead of its own real ID, into the SET session-ID part of the session-ID included in the SUPL POS INIT message. The target SET 905 also includes information on a network in which it is currently located, that is, the LID, in the SUPL POS INIT message.

H. Upon the SUPL POS INIT message from the target SET 905, the H-SLP 903 transfers it to the V-SLP 901.

I. The V-SLP 901 and the target SET 905 exchange messages necessary for positioning of the target SET 905. In the process of this, the V-SLP 901 identifies the target SET 905 by using the virtual ID created by the H-SLP 903, instead of the real ID of the target SET 905. Further, in order to transfer the messages between the V-SLP 901 and the target SET 905, the H-SLP 903 performs an operation of matching the virtual ID and the real ID through the mapping information.

J. Upon completing positioning of the target SET 905, the V-SLP 901 transmits a positioning result to the H-SLP 903.

K. Upon receiving the positioning result, the H-SLP 903 transmits it to the target SET 905. Further, the H-SLP 903 informs the target SET 905 of the ending of the location service by transmitting an SUPL END message thereto.

Figure 10:
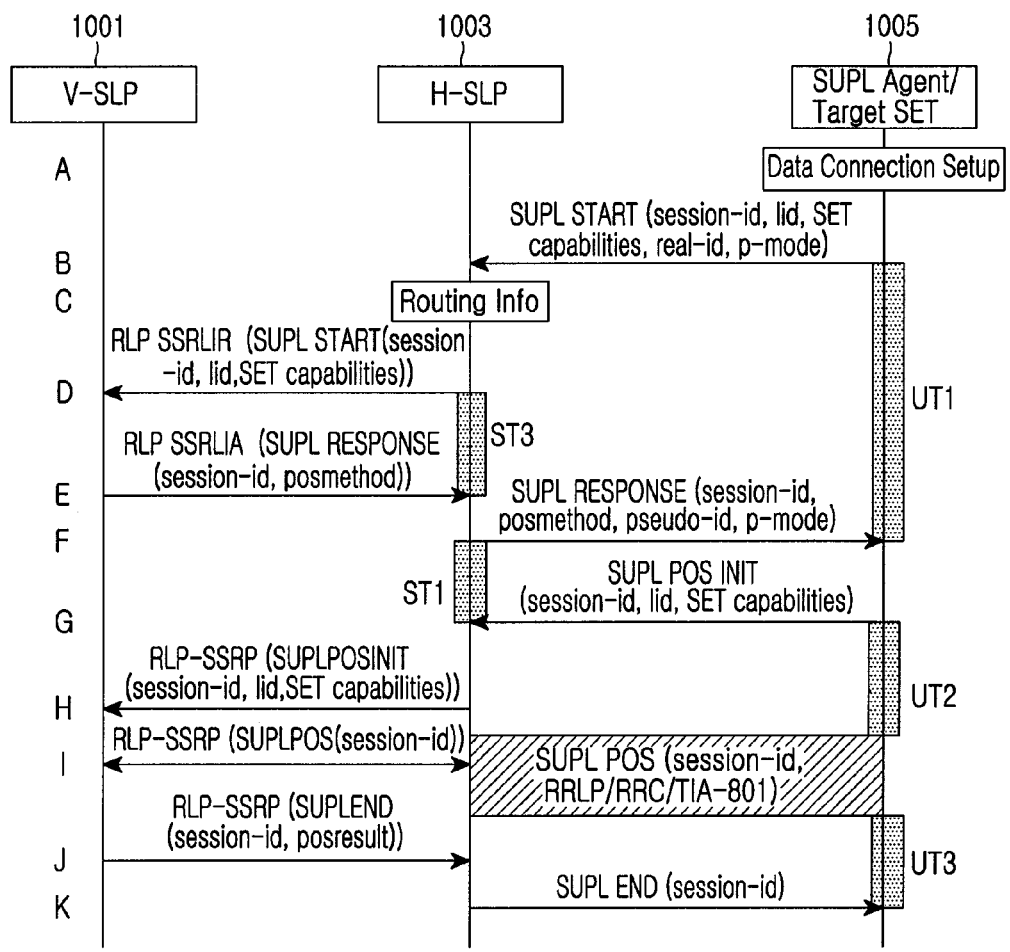
FIG. 10 is a flowchart illustrating a procedure of positioning a target SET when the target SET requests a location server to provide its own location information and yet creates its own virtual ID while roaming out of a home network in accordance with another exemplary embodiment of the present invention.

FIG. 10 is a flowchart illustrating a procedure of positioning a target SET in a case where the target SET itself creates its own virtual ID and transmits it together with its own real ID to an H-SLP when the target SET requests the H-SLP to provide its own location information. If the target SET is roaming in such a case, the H-SLP stores the virtual ID and real ID transmitted by the target SET and performs an operation of mapping them to each other, thereby preventing the real ID of the target SET from being transferred to an external entity in the process of positioning of the target SET.

Referring to FIG. 10, the procedure includes the following steps:

A. A target SET 1005, that is, an SUPL Agent, establishes data communication in order to obtain its own location information.

B. When the target SET 1005 is roaming in an external network, it creates a virtual ID to be used by itself Further, the target SET 1005 creates an SUPL START message in which the virtual ID is inserted into the SET session-ID part of the session-ID. The target SET 1005 also inserts an LID representing information on a network in which it is currently located, SET capability representing positioning method supportable by itself and protocols, and a P-mode parameter indicating whether or not to use the virtual ID into the SUPL START message. In addition, the target SET 1005 inserts its own real ID into the SUPL START message in order to receive service request authentication from an H-SLP 1003. The target SET 1005 transmits the SUPL START message created in this way, to the H-SLP 1003 in order to start a positioning process.

C. Upon receiving the SUPL START message from the target SET 1005, the H-SLP 1003 determines if the target SET 1005 is roaming out of a home network. When the target SET 1005 is roaming, the H-SLP 1003 looks into the P-mode parameter included in the SUPL START message to thereby determine if the target SET 1005 requests using the virtual ID. If the P-mode parameter indicates to use the virtual ID, the H-SLP 1003 stores the virtual ID and the real ID of the target SET 1005 transmitted through the SUPL START message, and performs an operation of mapping them. Further, the H-SLP 1003 stores and manages mapping information (e.g., mapping table) for the virtual ID and the real ID of the target SET 1005 until the session in progress ends or the currently requested location service ends, and performs an operating of converting the virtual ID and the real ID into each other.

D. Since the target SET 1005 is roaming, the H-SLP 1003 transmits a message (RLP SSRLIR message) corresponding to the location service request message (SUPL START message), which is received from the target SET 1005, to a V-SLP 1001, that is, an SLP existing in a network in which the target SET 1005 is currently located. In transmitting this message, the H-SLP 1003 deletes the real ID of the target SET 1005.

E. In response to the corresponding location service request, the V-SLP 1001 transmits a message (RLP SSRLIA message) to the H-SLP 1003.

F. The H-SLP 1003 transmits an SUPL RESPONSE message to the target SET 1005, in response to the SUPL START message received in step B. The SUPL RESPONSE message transmitted by the H-SLP 1003 includes the currently created virtual ID and a P-mode parameter indicating that the virtual ID, instead of the real ID of the target 1005, will be used for subsequent message transmissions.

G. The target SET 1005 transmits an SUPL POS INIT message to the H-SLP 1003 in order to initiate a positioning process. In transmitting this message, the target SET 1005 inserts the virtual ID, instead of its own real ID, into the SET session-ID part of the session-ID included in the SUPL POS INIT message. The target SET 1005 also includes information on a network in which it is currently located, that is, the LID, in the SUPL POS INIT message.

H. Upon the SUPL POS INIT message from the target SET 1005, the H-SLP 1003 transfers it to the V-SLP 1001.

I. The V-SLP 1001 and the target SET 1005 exchange messages necessary for positioning of the target SET 1005. In the process of this, the V-SLP 1001 identifies the target SET 1005 by using the virtual ID created by the target SET 1005, instead of the real ID of the target SET 1005. Further, in order to transfer the messages between the V-SLP 1001 and the target SET 1005, the H-SLP 1003 performs an operation of matching the virtual ID and the real ID through the mapping information.

J. Upon completing positioning of the target SET 1005, the V-SLP 1001 transmits a positioning result to the H-SLP 1003.

K. Upon receiving the positioning result, the H-SLP 1003 transmits it to the target SET 1005. Further, the H-SLP 1003 informs the target SET 1005 of the ending of the location service by transmitting an SUPL END message thereto.

Thus, it is obvious from FIG. 10 that a target SET itself may create and use its own virtual ID. Even in such a case, an H-SLP performs a mapping operation between the virtual ID and the real ID of the target SET. The aforementioned exemplary embodiments of FIGS. 9 and 10 may be chosen in implementing a location information providing system.

An SLP may be divided into an SLC and an SPC. With regard to this, if the real ID (e.g., ms-ID, MSISDN, IMSI, IP address, etc.) of a target SET is transmitted to the SPC, the real ID and location information of the target SET are transmitted together to the SPC. When hacking occurs in such a situation, there is a fear that the privacy of a user of the target SET is violated.

Thus, in view of the privacy of the user of the target SET, location information of the target SET must be carefully and securely treated. However, in the prior art, the SLC transmits the real ID of the target SET to the SPC, which causes a risk that the real ID and location information of the target SET are simultaneously exposed.

In general, a user of a target SET does not make a contract with an SPC, but makes a contract with an SLC for the management of its own real ID. Thus, in an exemplary embodiment of the present invention, positioning of a target SET is performed without transferring the real ID of the target SET to an SPC. Therefore, an exemplary embodiment of the present invention lowers the possibility that the real ID and location information of a target SET are simultaneously hacked, thereby enhancing the privacy protection for a user of the target SET. Further, in an exemplary embodiment of the present invention, since an SLC creates a pseudo-ID or pseudonym-ID and transfers it to an SPC, the privacy protection for a user of a target SET proves its worth in an environment where the SLC and the SPC are managed by different operators. This is because when an SLC and an SPC exist in separate networks, message exchange between the SLC and the SPC has a high risk that the real ID and location information of a target SET are simultaneously hacked.

Further, even when an H-SLP requests a V-SLP to perform positioning of a target SET in a situation where a target SET is roaming, an exemplary embodiment of the present invention prevents the real ID of the target SET from being transferred to the V-SLP. On this account, even if an unauthorized external entity hacks the real ID and location information of the target SET together in the middle of message transfer, the privacy of a user of the corresponding target SET can also be protected because the entity cannot know the real ID of the target SET.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a SUPL Location Center (SLC) for providing location information of a target Secure User Plane Location (SUPL) Enabled Terminal (target SET), the method comprising:
    receiving a location request message from a requester;
    transmitting a SUPL INITiation (SUPL INIT) message by using a first session IDentifier (ID) to the target SET, the first session ID includes a SET ID of the target SET in a SET session ID;
    transmitting a Positioning DATA (PDATA) message by using a second session ID to a SUPL Positioning Center (SPC), the second session ID is different from the first session ID for secure connection between the SLC and the SPC;
    receiving a positioning result of the target SET from the SPC; and
    transmitting the positioning result to the requester.

2. The method as claimed in claim 1, further comprising:
    transmitting a Positioning REQuest (PREQ) message by using the second session ID to the SPC.

3. The method as claimed in claim 2, wherein the first session ID comprises two parts of the SET session ID and a SUPL Location Platform (SLP) session ID and second session ID comprises two parts of a SLC session ID and a SPC session ID.

4. The method as claimed in claim 1, further comprising:
    receiving information including the first session ID, a Location ID (LID), and positioning capability information of the target SET.

5. The method as claimed in claim 1, further comprising:
    determining if the target SET is roaming.

6. The method as claimed in claim 1, further comprising:
    receiving a Positioning LID REQuest (PLREQ) message by using the second session ID from the SPC;
    transmitting a Positioning LID RESponse (PLRES) message including positioning measurement information by using the second session ID to the target SET;
    receiving positioning measurement information measured by the target SET by using the first session ID; and
    transmitting the positioning measurement information by using the second session ID to the SPC.

7. The method as claimed in claim 3, wherein the second session ID further comprises the SET session ID which is a unique number from a perspective of the target SET.

8. The method as claimed in claim 1, wherein the second session ID does not include the SET session ID or optionally includes the SET session ID which is a unique number from a perspective of the target SET.

9. The method as claimed in claim 1, wherein the SET ID comprises at least one of a Mobile Station International Integrated Services Digital Network (MSISDN), a Mobile Directory Number (MDN), a Mobile Identification Number (MIN), an International Mobile Subscriber Identity (IMSI), a Network Access Identifier (NAI), and an Internet Protocol (IP) address.

10. A Secure User Plane Location (SUPL) Location Center SLC for providing location information of a target SUPL Enabled Terminal (target SET), the SLC comprising:
   a transceiver configured to receive a location request message from a requester, transmit a SUPL INITiation (SUPL INIT) message by using a first session IDentifier (ID) to the target SET, transmit a Positioning DATA (PDATA) message by using a second session ID to the SUPL Positioning Center (SPC), receive a positioning result of the target SET from the SPC and transmit the positioning result to the requester; and
   a controller configured to generate the first session ID includes a SET ID of the target SET in a SET session ID and the second session ID is different from the first session ID for secure connection between the SLC and the SPC.

11. The SLC as claimed in claim 10, wherein the transceiver is further configured to transmit a Positioning REQuest (PREQ) message by using the second session ID to the SPC.

12. The SLC as claimed in claim 11, wherein the first session ID comprises two parts of the SET session ID and a SUPL Location Platform (SLP) session ID and second session ID comprises two parts of a SLC session ID and a SPC session ID.

13. The SLC as claimed in claim 10, wherein the transceiver is further configured to receive information including the first session ID, a Location ID (LID), and positioning capability information of the target SET.

14. The SLC as claimed in claim 10, wherein the controller is further configured to determine if the target SET is roaming.

15. The SLC as claimed in claim 10, wherein the transceiver is further configured to receive a Positioning Location ID (LID) REQuest (PLREQ) message by using the second session ID from the SPC, transmit a Positioning LID RESponse (PLRES) message including positioning measurement information by using the second session ID to the target SET, receive positioning measurement information measured by the target SET by using the first session ID, and transmit the positioning measurement information by using the second session ID to the SPC.

16. The SLC as claimed in claim 10, wherein the second session ID further comprises the SET session ID which is a unique number from a perspective of the target SET.

17. The SLC as claimed in claim 10, wherein the second session ID does not include the SET session ID or optionally includes the SET session ID which is a unique number from a perspective of the target SET.

18. The SLC as claimed in claim 10, wherein the SET ID comprises at least one of a Mobile Station International Integrated Services Digital Network (MSISDN), a Mobile Directory Number (MDN), a Mobile Identification Number (MIN), an International Mobile Subscriber Identity (IMSI), a Network Access Identifier (NAI), and an Internet Protocol (IP) address.

* * * * *